United States Patent
Yamashita et al.

(10) Patent No.: US 7,555,195 B2
(45) Date of Patent: Jun. 30, 2009

(54) CONTENT COMBINATION REPRODUCER, CONTENT COMBINATION REPRODUCTION METHOD, PROGRAM EXECUTING THE METHOD, AND RECORDING MEDIUM RECORDING THEREIN THE PROGRAM

(75) Inventors: Hiroyuki Yamashita, Yokohama (JP); Hiroshi Fujii, Yokohama (JP); Hideki Sakamoto, Tokyo (JP); Takao Nakamura, Yokohama (JP)

(73) Assignee: Nippon Telegraph and Telephone Corporation (JP)

( * ) Notice: Subject to any disclaimer, the term of this patent is extended or adjusted under 35 U.S.C. 154(b) by 1328 days.

(21) Appl. No.: 10/414,988

(22) Filed: Apr. 16, 2003

(65) Prior Publication Data
US 2003/0195021 A1    Oct. 16, 2003

(30) Foreign Application Priority Data
Apr. 16, 2002    (JP)    ............................. P2002-113825

(51) Int. Cl.
*H04N 9/79*    (2006.01)
*H04N 5/00*    (2006.01)
(52) U.S. Cl. ........................................ 386/35; 386/125
(58) Field of Classification Search .................. 386/35, 386/45–46, 95, 102, 125–126
See application file for complete search history.

(56) References Cited

U.S. PATENT DOCUMENTS 7,068,309 B2 *    6/2006    Toyama et al. ............ 348/231.5
2002/0174430 A1 *    11/2002    Ellis et al. ..................... 725/46

FOREIGN PATENT DOCUMENTS

| JP | 09-101990 | 4/1997 |
|---|---|---|
| JP | 11-353325 | 12/1999 |
| JP | 2000-242661 | 9/2000 |
| JP | 2001-125904 | 5/2001 |
| JP | 2001-292383 | 10/2001 |
| JP | 2001-326924 | 11/2001 |
| JP | 2002-101406 | 4/2002 |

* cited by examiner

*Primary Examiner*—Thai Tran
*Assistant Examiner*—Nigar Chowdhury
(74) *Attorney, Agent, or Firm*—Kilpatrick Stockton LLP

(57) ABSTRACT

Content data and metadata are obtained and reproduced, and combination interface information defining information necessary for executing combination operation on the contents is generated. The combination operation on the contents is controlled by following combination data definition based on the combination interface information and, as necessary, by using external input information entered from an external unit. The combination feedback information for controlling the reproduction operation of the contents and metadata is generated, and the reproduction operation on the contents is controlled based on the combination feedback information.

13 Claims, 18 Drawing Sheets

FIG.5

| METADATA<br>OBJECT \ 5W1H INFORMATION | WHEN | WHERE | WHO | WHAT | HOW | WHAT TO DO |
|---|---|---|---|---|---|---|
| PERSON 1 | EARLY SUMMER | PLATEAU | ACTRESS A | GOLF | HAPPY | HAVE LESSON |
| PERSON 2 | EARLY SUMMER | PLATEAU | ACTOR B | GOLF | KIND | INSTRUCT |
| BACKGROUND VIDEO | EARLY SUMMER | MOUNT FUJI | | BULLET TRAIN | | |
| TELOP | | | | GOLF LESSON | | |
| EFFECT SOUND | | | | GOLF PUTTER | | |
| BACKGROUND MUSIC | | | | THEME SONG | REFRESHING | |
| SCRIPT | EARLY SUMMER | PLATEAU | ACTOR B | HOLE POSITION | LOUD | SHOUT |

FIG.6
COMBINATION INTERFACE INFORMATION
| TYPE NO. | CONTENT IDENTIFIER | REPRODUCTION TIME INFORMATION | CONTENT DATA | METADATA ||||||
|---|---|---|---|---|---|---|---|---|---|
| | | | | WHEN | WHERE | WHO | WHAT | HOW | WHAT TO DO |
| 1 | cid:00010123 | 00:00:00.000 | 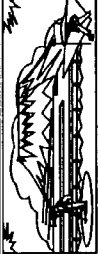 | 00010004 | 01234567 | 11223456 | 01221234 | 13579012 | 24680345 |
| 2 | cid:00010123 | 00:01:00.000 | | | | | | | |
| 3 | cid:00010123 | 00:05:00.000 |  | 00010004 | 01357901 | 11223456 | 01221555 | 09765234 | 12345678 |
| 4 | cid:00010123 | 00:10:00.000 |  | 00010005 | 02468024 | 11246800 | 02233440 | 09763567 | 12345555 |
| 5 | cid:00010123 | 00:15:00.000 | 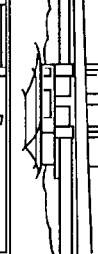 | 00010005 | 01122334 | 00000000 | 00345699 | 00001234 | 00002345 |
| 6 | cid:00010123 | 00:30:00.000 | | | | | | | |
| 7 | cid:00010123 | 00:40:00.000 | | | | | 20406080 | | |
REPRODUCTION ELAPSED TIME INFORMATION
CONTENT STILL INFORMATION
CODED 5W1H INFORMATION

FIG. 7 COMBINATION DATA

| ROW | COMBINATION DATA — REPRODUCTION TIME INFORMATION OR 5W1H INFORMATION | CONTENT IDENTIFIER | CONTENTS | URL | CONTENT REPRODUCER OPERATION CONTROL INFORMATION | EXTERNAL UNIT OPERATION CONTROL INFORMATION | COMPUTER PROGRAM |
|---|---|---|---|---|---|---|---|
| 1 | GOLF | cid:01234567 | 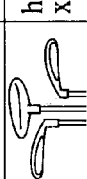 | http://www.xyz.golf.com/ | | | |
| 2 | GOLF & LESSON | cid:01234680 |  | http://www.xyz.golf.com/lesson/ | | | GOLF EXE |
| 3 | MOUNT FUJI | cid:0110233210 | 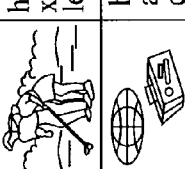 | http://www.abcde.travel.co.jp/fuji/ | | | |
| 4 | ACTRESS A | cid:0246001122 |  | http://www.aaa.bbb.com/A/index.html | 1. PAUSE 2. 45-SECOND TIMEKEEPING 3. RESTART | | |
| 5 | REPRODUCTION ELAPSED TIME IS 00:01:00:000 | cid:0111223344 |  | http://www.bbb.ccc.com/000100/ | 1. PAUSE 2. 45-SECOND TIMEKEEPING 3. RESTART | | |
| 6 | REPRODUCTION ELAPSED TIME IS 00:10:00:000 | cid:0111223355 |  | http://www.bbb.ccc.com/001000/ | 1. PAUSE 2. WAIT TO ENTER 3. RESTART | | GAME EXE |
| 7 | REPRODUCTION ELAPSED TIME IS LATER THAN 00:30:00:000 & EFFECT SOUND | | | http://www.qwerty.com/sound/0030/ | | 1. SW ON 2. SW OFF 3. REPEAT 3 TIMES | |

COMBINATION FEEDBACK INFORMATION

FIG.19

COMBINATION DATA CORRESPONDING ONLY TO REPRODUCTION TIME INFORMATION

| ROW | REPRODUCTION TIME INFORMATION \ COMBINATION DATA | CONTENT IDENTIFIER | CONTENTS | URL | CONTENT REPRODUCER OPERATION CONTROL INFORMATION | EXTERNAL UNIT OPERATION CONTROL INFORMATION | COMPUTER PROGRAM |
|---|---|---|---|---|---|---|---|
| 1 | t2 | cid:01234567 | 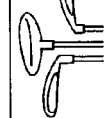 | http://www.xyz.golf.com/ | | | |
| 2 | t3 | cid:01234680 |  | http://www.xyz.golf.co m/lesson/ | | |  GOLF.EXE |
| 3 | t1 | cid:0110233210 |  | http://www.abcde.travel.co.jp/fuji/ | | | |
| 4 | t2 | cid:0246001122 | 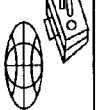 | http://www.aaa.bbb.com/A/index.html | 1. PAUSE<br>2. 45-SECOND TIMEKEEPING<br>3. RESTART | | |

| REPRODUCTION TIME | 5W1H INFORMATION ON OBJECT |
|---|---|
| t1 | MOUNT FUJI |
| t2 | ACTRESS A |
| t2 | GOLF |
| t3 | GOLF & LESSON |

CONTENT INFORMATION PROVIDED BEFORE COMBINATION DATA CREATION →

CONTENT COMBINATION REPRODUCER, CONTENT COMBINATION REPRODUCTION METHOD, PROGRAM EXECUTING THE METHOD, AND RECORDING MEDIUM RECORDING THEREIN THE PROGRAM

CROSS REFERENCE TO RELATED APPLICATION

This application claims benefit of priority under 35 U.S.C. §119 to Japanese Patent Application No. 2002-113825, filed on Apr. 16, 2002, the entire contents of which are incorporated by reference herein.

BACKGROUND OF THE INVENTION

1. Field of the Invention

The present invention relates to a content combination reproducer (a player that plays back contents such as video contents or audio contents), a content combination reproduction method, a program executing the method, and a recording medium recording therein the program that can provide various content related information and various services, including a chance to play games, as a combination operation while reproducing contents and, in relation to the contents, metadata which is information representing the contents and, at the same time, allow not only the content provider but also a third party to provide additional information, services, and games.

2. Description of the Related Art

With reference to FIG. 1, an example of a conventional content combination reproduction system will be described. In the figure, the symbol ba indicates a content provider system that comprises a content delivery server $9a1$, a delivery content storage unit $4a11$, a related information delivery server $9a2$, and a delivery related information storage unit $4a12$. The numeral $1a$ indicates a content combination reproduction system that comprises a user terminal $2a$ and a keyboard $2a7$. The user terminal $2a$ has content reproducing means $2a1$, related information accessing means $2aa$, a content display window $2a5$, and a related information display window $2a6$. Reproduced contents are displayed in the content display window $2a5$, and obtained related information is displayed in the related information display window $2a6$. The symbol aa indicates a network. The content provider stores delivery contents $5a$ in the delivery content storage unit $4a11$ and, at the same time, creates related information $8a$ on the contents in advance and stores the created information in the delivery related information storage unit $4a12$.

In the conventional content combination reproduction system $1a$ shown in FIG. 1, the contents $5a$ stored in the delivery content storage unit $4a11$ are delivered from the content delivery server $9a1$ to the user terminal $2a$ via the network aa and are displayed in the content display window $2a5$ by the content reproducing means $2a1$. A "related information address" $fa1$ indicating the location of related information on the contents is included in the display. The "related information address" $fa1$, embedded in the delivered contents, is sent to the user terminal. Upon finding the display, the user of the user terminal $2a$ enters the "related information address" $fa1$ from the keyboard $2a7$. This causes the related information accessing means $2aa$ to return related information $8a$, which is stored in the delivery related information storage unit $4a12$ connected to the related information delivery server $9a2$ corresponding to the address $fa1$, to the user terminal $2a$ via the network aa and displays the related information in the related information display window $2a6$.

FIG. 2 is a diagram showing an example of content charge payment in the conventional content combination reproduction system. In the figure, the numeral $b6$ indicates a content provider system, the numeral 16 indicates a content combination reproduction system (user terminal), the numeral $d6$ indicates a content charge settlement system, and the numeral $e6$ indicates a payment system.

When an audience has an audience's account $e61$ in the payment system $e6$, the content charge is paid according to the following flow. First, an audience who uses the user terminal 16 views the contents provided by the content provider system $b6$ (step S911). Content usage information is sent from the user terminal 16 to the content charge settlement system $d6$ (step S913).

The content charge settlement system $d6$ calculates the content charge based on the content usage information sent from the user terminal 16, requests the payment system $e6$ to transfer the content charge from the audience's account $e61$ and, after completion of the transfer, receives the completion notification (step S915). The content charge settlement system $d6$ sends the content charge, collected from the audience, and its notification to the content provider system $b6$ (step S917).

In the conventional content combination reproduction system, content reproduction and a combination operation, such as content-related information provision, content-related service provision, and content-related game chance provision, are performed somewhat independently as described above.

In addition, content reproduction and the combination operation, such as content-related information provision, content-related service provision, and content-related game chance provision, are done by the content provider or by very limited providers that have obtained permission from the content provider. A content charge is sent from an audience to the content provider.

Because content reproduction and the combination operation, such as content-related information provision, content-related service provision, and content-related game chance provision, are performed in the conventional content combination reproduction system somewhat independently as described above, the problems given below arise.

That is, the combination operation, such as information provision or service provision related to content reproduction, cannot be controlled flexibly; for example, the combination operation cannot be synchronized with content reproduction or associated with the particular details on the contents. For example, when a car appears during video content reproduction, the problem is that advertisement information on the car cannot be displayed as related information at the same time the car is displayed.

SUMMARY OF THE INVENTION

In view of the foregoing, it is an object of the present invention to provide a content combination reproducer, a content combination reproduction method, a program executing the method, and a recording medium recording therein the program that flexibly control content combination reproduction by synchronizing the combination operation, such as content reproduction related information provision or service provision, with content reproduction or by associating the combination operation with particular details on the contents.

To achieve the above object, there is provided a content combination reproducer capable of providing content related information and services as a combination operation while reproducing contents and, in relation to the contents, metadata which is information representing the contents, the content combination reproducer comprising: content reproducing means for obtaining the contents and the metadata attached to the contents to reproduce the contents and the metadata; and combination interface information generating means for generating combination interface information that includes content reproduction times, content data, and metadata and that defines information necessary for executing the combination operation on the contents.

The present invention obtains contents and metadata, reproduces the contents and metadata, and generates combination interface information defining information necessary for the combination operation on the contents. This makes it possible to execute the combination operation while reproducing contents and metadata with the use of the combination interface information and to provide various types of content-related information and various services including games.

In a preferred embodiment of the present invention, the content combination reproducer further comprises: combination data storing means for storing therein combination data that corresponds to the combination interface information and that defines an operation related to the contents; and combination operation controlling means for obtaining the combination data stored in the combination data storing means to control an execution of the combination operation on the contents by following a definition of the combination data based on the combination interface information and by using external input information entered from an external unit as necessary.

This embodiment obtains combination data from a combination data storing means and controls the execution of combination operation on the contents by following the definition of the combination data based on combination interface information and by using information entered from an external unit as necessary. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the contents distribution related business, and bring about an important economic effect.

In a preferred embodiment of the present invention, the content combination reproducer further comprises: combination feedback information generating means for generating combination feedback information used for controlling a reproduction operation of the contents and the metadata based on the combination data and, as necessary, external input information; and feedback controlling means for controlling the reproduction operation of the contents by the content reproducing means based on the generated combination feedback information.

This embodiment generates combination feedback information that controls the reproduction operation of contents and metadata and controls the content reproduction operation based on the combination feedback information. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the content distribution related business, and bring about an important economic effect.

In a preferred embodiment of the present invention, the combination data storing means has means for storing at least one of advertisement contents, content related service information, content related information contents, content related quiz information, and content related game information as the combination data or for storing obtaining information for obtaining the at least one; and the combination operation controlling means has means for controlling an execution of the combination operation related to the at least one according to the at least one stored in the combination data storing means or according to the at least one obtained based on the obtaining information stored in the combination data storing means and for requesting a provider of the at least one to pay a charge for the combination operation or a part of the charge thereof based on the at least one and the combination operation or an operation result thereof.

This embodiment allows the user to obtain at least one unit of information as the combination data from advertisement contents, content related service information, content related information contents, content related quiz information, and content related game information, controls the execution of combination operation related to the at least one unit of information, and charges the provider of the at least one of information for all or part of the combination operation based on the at lest one of information and combination operation or its operation result. Therefore, when advertisement contents, content related service information, information contents, quiz information, or game information is provided, the information provider is requested to pay the charge and the user is able to obtain a variety of information at no charge.

In a preferred embodiment of the present invention, the combination data storing means is connected to the combination operation controlling means via a network, and the combination operation controlling means has means for accessing the combination data storing means via the network to obtain the combination data stored in the combination data storing means.

In a preferred embodiment of the present invention, the content reproducing means has means for obtaining the contents and the metadata attached to the contents via a network.

In a preferred embodiment of the present invention, the content reproducing means, the combination interface information generating means, and the feedback controlling means are integrated into a content reproducer, the combination operation controlling means and the combination feedback information generating means are integrated into a combination processor, and the content reproducer and the combination processor are connected via a network.

To achieve the above object, there is provided a content combination reproducer capable of providing content related information and services as a combination operation while reproducing contents and, in relation to the contents, metadata which is information representing the contents, the content combination reproducer comprising: combination data storing means for storing therein combination data that corresponds to combination interface information, which includes content reproduction times, content data, and metadata and which defines information necessary for executing a combination operation on the contents, and that defines an operation related to the contents; and combination operation controlling means for obtaining the combination data stored in the combination data storing means to control an execution of the combination operation on the contents by following a definition of the combination data based on the combination interface information and by using external input information entered from an external unit as necessary.

The present invention obtains combination data from a combination data storing means and controls the execution of combination operation on the contents by following the definition of the combination data based on combination interface information and by using information entered from an external unit as necessary. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the content distribution related business, and bring about an important economic effect.

To achieve the above object, there is provided a content combination reproduction method capable of providing content related information and services as a combination operation while reproducing contents and, in relation to the contents, metadata which is information representing the contents, the content combination reproduction method comprising the steps of: a first step for obtaining the contents and the metadata attached to the contents to reproduce the contents and the metadata; and a second step for generating combination interface information that includes content reproduction times, content data, and metadata and that defines information necessary for executing the combination operation on the contents.

The present invention obtains contents and metadata, reproduces the contents and metadata, and generates combination interface information defining information necessary for the combination operation on the contents. This makes it possible to execute the combination operation while reproducing contents and metadata with the use of the combination interface information and to provide various types of content related information and various services including games.

In a preferred embodiment of the present invention, the content combination reproduction method further comprises the steps of: a third step for creating combination data, which corresponds to the combination interface information and which defines an operation related to the contents, in advance and for storing the combination data in combination data storing means; and a fourth step for obtaining the combination data stored in the combination data storing means to control an execution of the combination operation on the contents by following a definition of the combination data based on the combination interface information and by using external input information entered from an external unit as necessary.

This embodiment obtains combination data from a combination data storing means and controls the execution of combination operation on the contents by following the definition of the combination data based on combination interface information and by using information entered from an external unit as necessary. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the content distribution related business, and bring about an important economic effect.

In a preferred embodiment of the present invention, the content combination reproduction method further comprises the steps of: a fifth step for generating combination feedback information used for controlling a reproduction operation of the contents and the metadata based on the combination data and, as necessary, external input information; and a sixth step for controlling the reproduction operation of the contents by the first step based on the generated combination feedback information.

This embodiment generates combination feedback information that controls the reproduction operation of contents and metadata and controls the content reproduction operation based on the combination feedback information. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the content distribution related business, and bring about an important economic effect.

In a preferred embodiment of the present invention, the third step comprises a seventh step for storing at least one of advertisement contents, content related service information, content related information contents, content related quiz information, and content related game information as the combination data or for storing obtaining information for obtaining the at least one in the combination data storing means and the fourth step comprises an eighth step for controlling an execution of the combination operation related to the at least one according to the at least one stored in the combination data storing means or according to the at least one obtained based on the obtaining information stored in the combination data storing means and for requesting a provider of the at least one to pay a charge for the combination operation or a part of the charge thereof based on the at least one and the combination operation or an operation result thereof.

The present invention allows the user to obtain at least one unit of information as the combination data from advertisement contents, content related service information, content related information contents, content related quiz information, and content related game information, controls the execution of combination operation related to the at least one unit of information, and charges the provider of the at least one of information for all or part of the combination operation based on the at lest one of information and combination operation or its operation result. Therefore, when advertisement contents, content related service information, information contents, quiz information, or game information is provided, the information provider is requested to pay the charge and the user is able to obtain a variety of information at no charge.

To achieve the above object, there is provided a content combination reproduction method capable of providing content related information and services as a combination operation while reproducing contents and, in relation to the contents, metadata which is information representing the contents, the content combination reproduction method comprising the steps of: a first step for creating combination data that corresponds to combination interface information, which includes content reproduction times, content data, and metadata and which defines information necessary for executing a combination operation on the contents, and that defines an operation related to the contents and for storing the created combination data in combination date storing means; and a second step for obtaining the combination data stored in the combination data storing means to control an execution of the combination operation on the contents by following a definition of the combination data based on the combination interface information and by using external input information entered from an external unit as necessary.

The present invention obtains combination data from a combination data storing means and controls the execution of combination operation on the contents by following the definition of the combination data based on combination interface information and by using information entered from an external unit as necessary. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the contents distribution related business, and bring about an important economic effect.

To achieve the above object, there is provided a program executing the content combination reproduction method described above.

To achieve the above object, there is provided a computer readable recording medium recording therein the program described above.

The recording medium according to the present invention, which records therein the program described above, makes it easy to distribute the program.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a diagram showing an example of metadata corresponding to contents used in the content combination reproduction system in the embodiment shown in FIG. 3;

FIG. 6 is a diagram showing an example of combination interface information corresponding to contents and metadata used in the content combination reproduction system in the embodiment shown in FIG. 3;

FIG. 7 is a diagram showing an example of combination data corresponding to combination interface information used in the content combination reproduction system in the embodiment shown in FIG. 3;

FIG. 19 is a diagram showing an example of combination data corresponding only to reproduction time information in the content combination reproduction system in the embodiment shown in FIG. 3.

DESCRIPTION OF THE PREFERRED EMBODIMENTS

Figure 1:
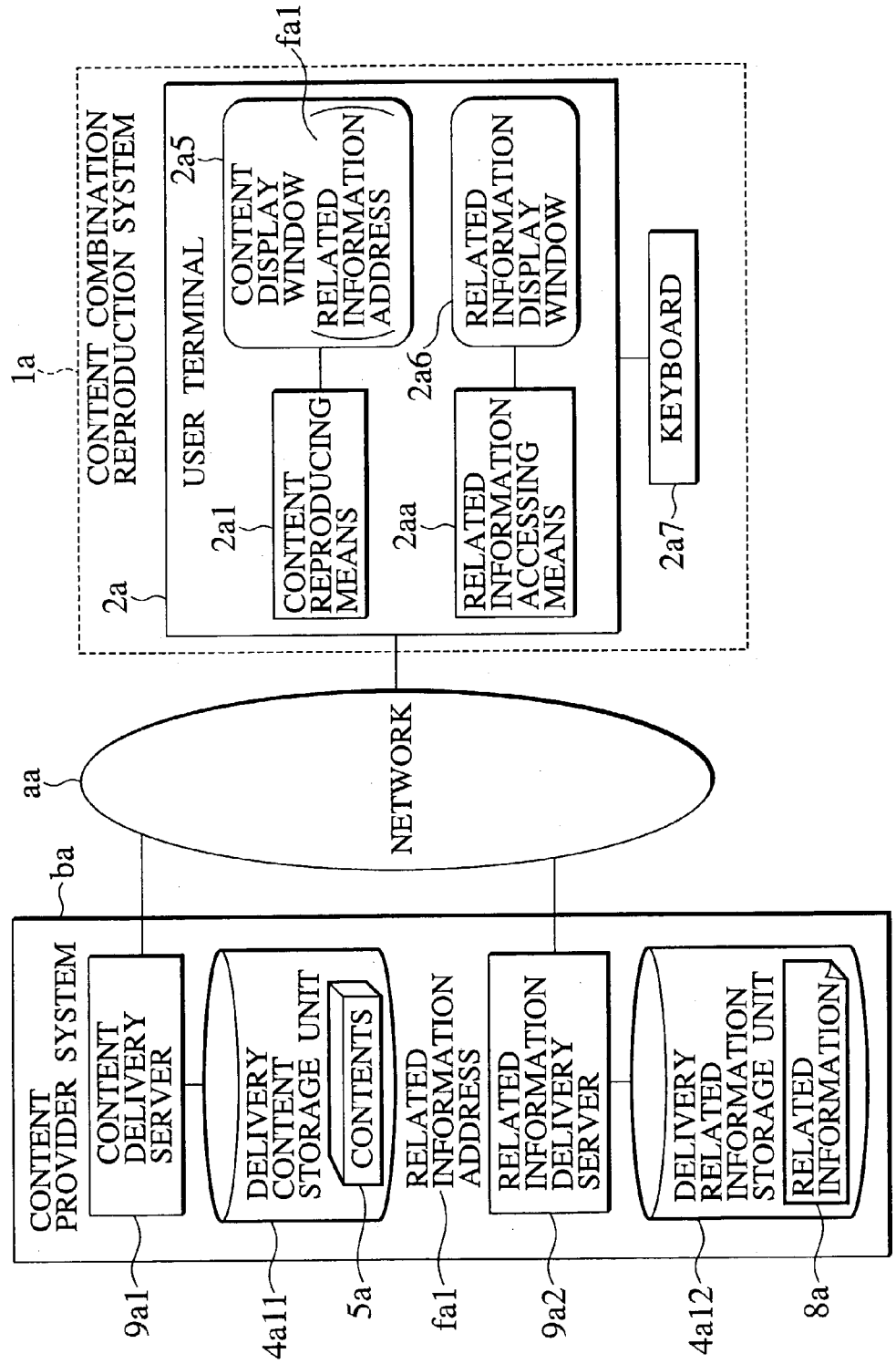
FIG. 1 is a block diagram showing the configuration of a content combination reproduction system in the prior art.
Figure 2:
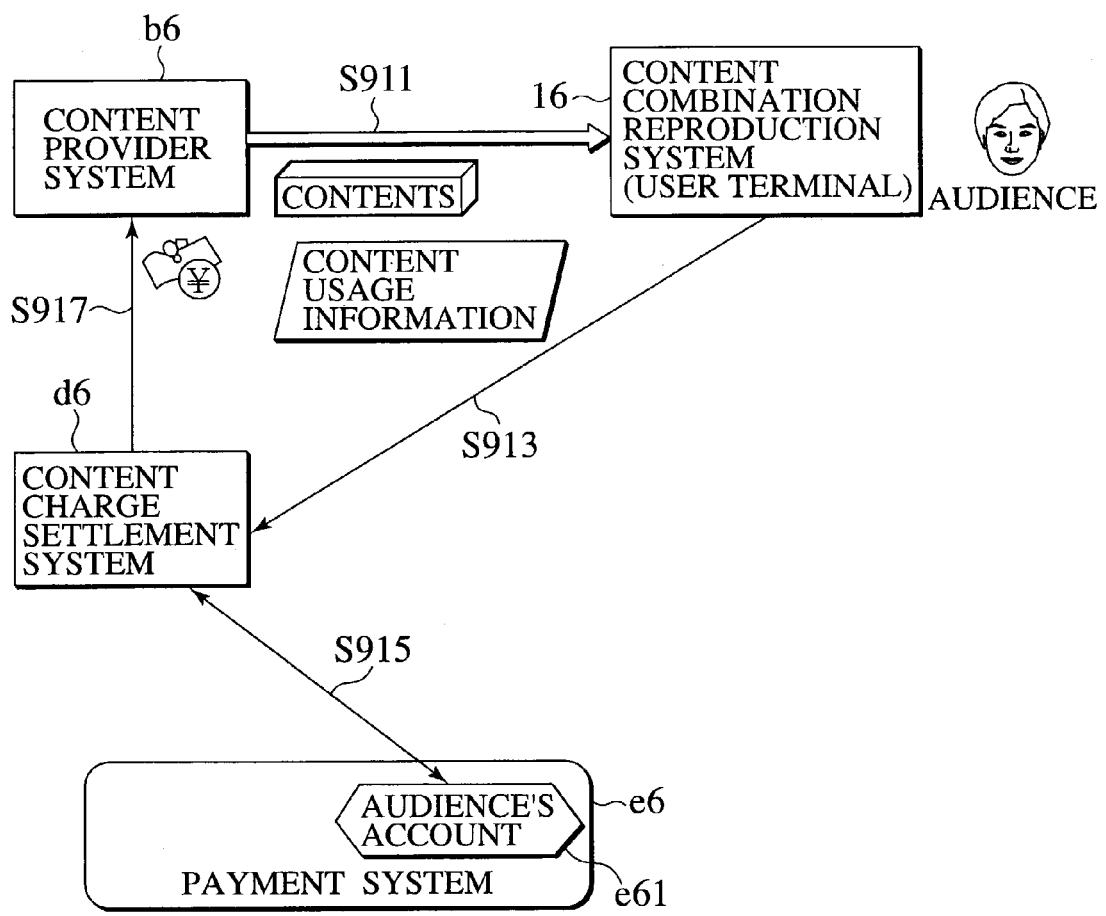
FIG. 2 is a diagram showing an example of content charge payment processing in the content combination reproduction system in the prior art.
Figure 3:
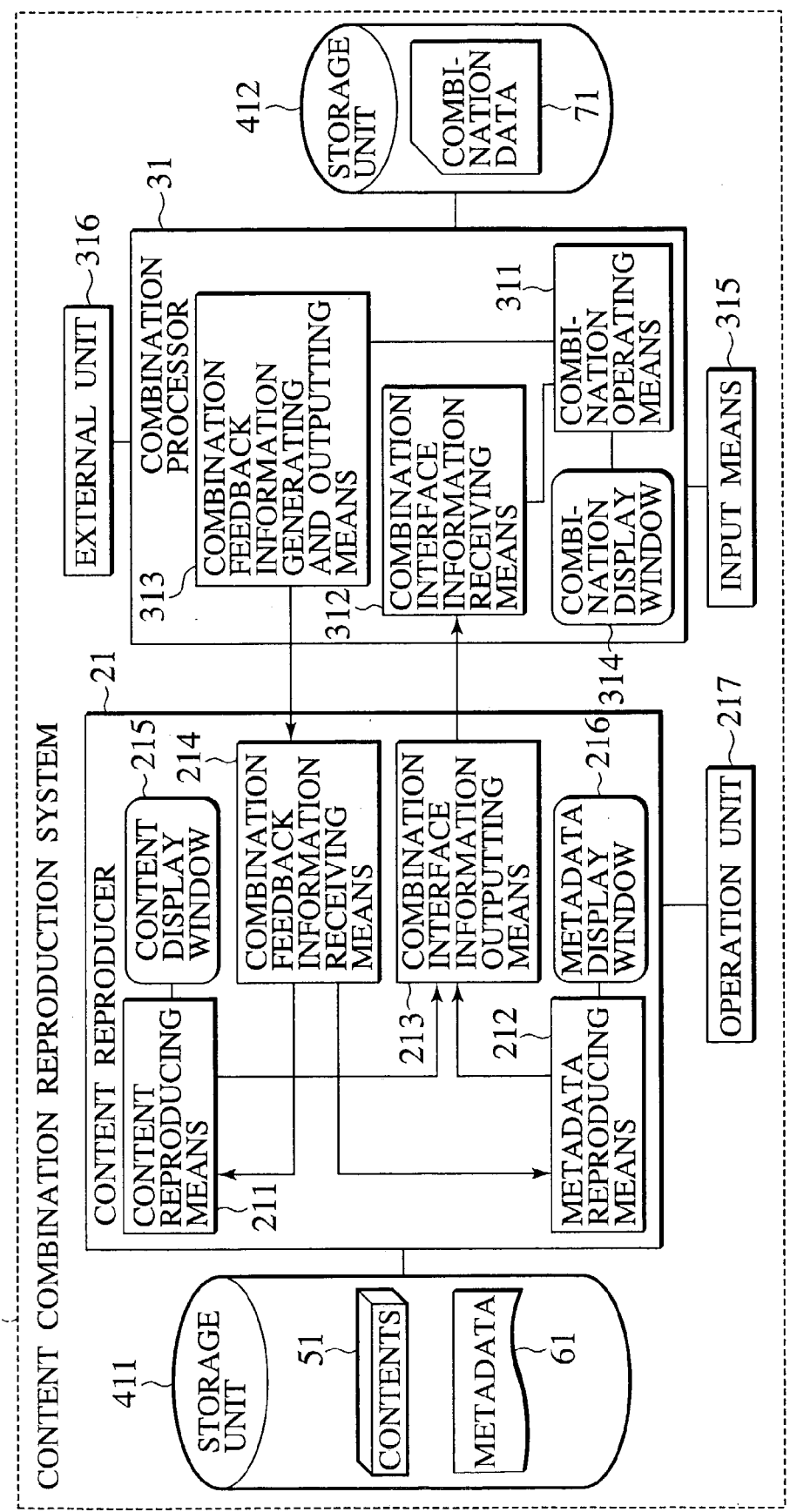
FIG. 3 is a block diagram showing the configuration of a content combination reproduction system corresponding to a content combination reproducer in an embodiment of the present invention.

With reference to the drawings, some embodiments of the present invention will be described below. FIG. 3 is a block diagram showing the configuration of a content combination reproduction system corresponding to a content combination reproducer in an embodiment of the present invention.

A content combination reproduction system 11 shown in the figure is a system capable of providing content related information and services as the combination operation while reproducing contents and, in relation to the contents, metadata which is information representing the contents of the contents. The content combination reproduction system 11 comprises a storage unit 411 that stores therein contents and metadata attached to the contents; a content reproducer 21 that obtains contents and metadata attached to the contents from the storage unit 411, reproduces the contents and metadata and, at the same time, generates and outputs combination interface information including the content reproduction times, content data, and metadata and defining information necessary for performing the combination operation for the contents; a storage unit 412 that constitutes combination data storing means in which combination data corresponding to the combination interface information and defining the operation associated with the contents is created and stored, for example, by a third party; and a combination processor 31 that obtains combination data from the storage unit 412 and, according to the definition of the combination data based on the combination interface information and using external input information entered from an external device as necessary, performs the combination operation for the contents reproduced by the content reproducer 21.

An operation unit 217 composed of a keyboard, mouse, operation panel, remote controller, and so on, is connected to the content reproducer 21 according to the configuration. Input means 315 composed of a keyboard, mouse, operation panel, joystick, microphone, and so on is connected to the combination processor 31 as an attachment or an external unit. This input means 315 is used to receive the external input information. Also connected to the combination processor 31 is an external unit 316, such as a large screen display, doll or robot, and game machine. The operation unit 217 connected to the content reproducer 21 and the input means 315 connected to the combination processor 31 may be shared as one input operation means when the content reproducer 21 and the combination processor 31 are integrated or when some other need arises. That is, the content reproducer 21 and the combination processor 31 may be connected via a network or may be integrated. In particular, when the system is built in a reduced configuration where the combination processor 31 has not a combination display window 314, the content reproducer 21 and the combination processor 31 are integrated and, as a result, the operation unit 217 and the input means 315 are combined into one input operation means for shared use.

The combination processor 31 also has combination feedback information generating and outputting means 313. This combination feedback information generating and outputting means 313 constitutes combination feedback information generating means that generates combination feedback information used to control the reproduction operation of the content data and metadata, based on the combination data and, as necessary, on external input information, and outputs the generated information to the content reproducer 21.

The content reproducer 21 has content reproducing means 211 for reproducing contents and metadata obtained from the storage unit 411. Upon receiving the combination feedback information from the combination processor 31 via combination feedback information receiving means 214, the content reproducer 21 controls the content reproduction operation in the content reproducing means 211 using the combination feedback information receiving means 214, which constitutes feedback control means, based on the received combination feedback information.

The content reproducer 21 also has combination interface information outputting means 213 that constitutes combination interface information generating means for generating and outputting combination interface information. This combination interface information includes content reproduction times, content data, and metadata obtained from the storage unit 411 as described above and defines information necessary for executing the combination operation for the contents. In addition, the content reproducer 21 comprises content reproducing means 211 for reproducing contents, a content display window 215 in which contents reproduced by the content reproducing means 211 are displayed, metadata reproducing means 212 for reproducing metadata, and a metadata display window 216 in which metadata reproduced by the metadata reproducing means 212 is displayed.

The combination processor 31 comprises combination interface information receiving means 312 for receiving combination interface information from the combination interface information outputting means 213 of the content reproducer 21; combination operating means 311 that constitutes combination operation controlling means for performing the combination operation on the contents reproduced by the content reproducer 21, based on the combination interface information received by the combination interface information receiving means 312, following the definition of the combination data, and using external input information entered from an external unit via the input means 315; and a combination display window 314 in which the combination operation is displayed. The external input information described above also includes environmental information used by the content combination reproduction system 11 such as temperature and humidity data.

The content combination reproduction system 11 shown in FIG. 3 is most typically a user terminal in which the content reproducer 21 and the combination processor 31 are integrated and which displays reproduced contents in the content display window 215. The storage unit 411 and the storage unit 412 may also be connected to the user terminal. Preferably, the storage unit 411 and the storage unit 412 are connected to the user terminal, composed of the content reproducer 21 and the combination processor 31, over a network such as the Internet to allow the user terminal to obtain information over the network. Although the content reproducer 21 and the combination processor 31 are preferably integrated as a user terminal, they need not always be integrated because a reduced configuration is also possible where the combination display window 314 is not necessary; instead, the content reproducer 21 and the combination processor 31 may be connected over the network. The network may be not only a communication line network but also a broadcasting network, a CATV network, or a home network.

Figure 4:
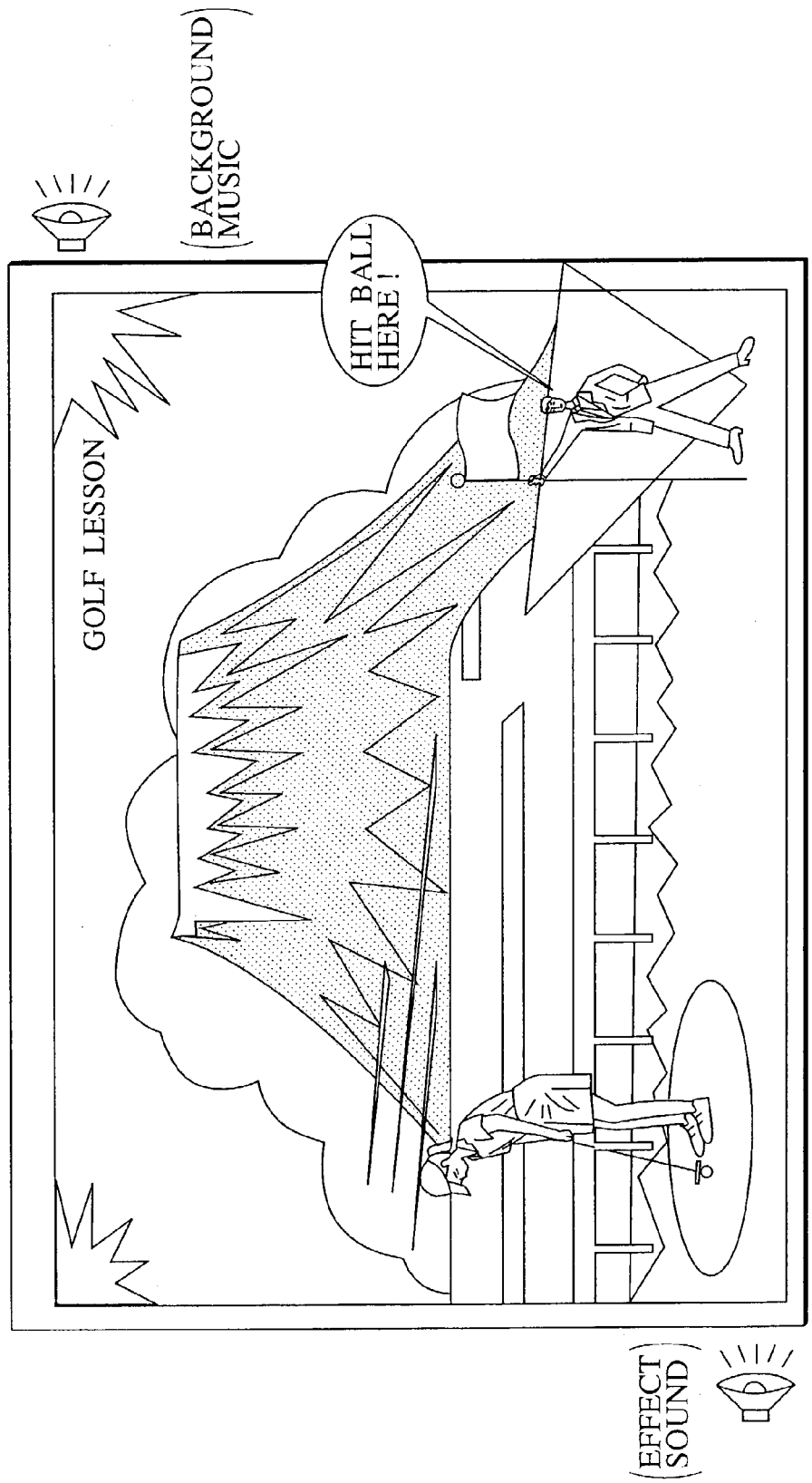
FIG. 4 is a diagram showing an image of an example of video contents reproduced in the content display window in the content combination reproduction system in the embodiment shown in FIG. 3.

FIG. 4 is a diagram showing an image of video contents reproduced in the content display window 215. This video contents include moving pictures, music (background), and voice ("Hit ball here") to be processed in the content combination reproduction system 11 in the embodiment shown in FIG. 3. The figure shows a still image at a point in time though the video contents including screen contents and sounds vary over time. The contents include one man and one woman who are playing golf against a background of Mount Fuji and a bullet train. The telop "Golf Lesson" appears in the top right corner, and effect sounds, background music, and the man's script are reproduced.

The content combination reproduction system 11 (for example, a user terminal) is used in an environment in which, for contents obtained from the storage unit 411 over a network using the content reproducing means 211, a third party creates combination data defining an operation related to the contents, stores the created combination data in the storage unit 412, and puts the combination data on the Internet. In this environment, the content combination reproduction system 11, that is, a user terminal, allows the user to obtain combination data from the Internet and, using the obtained combination data, to do a combination operation on the contents reproduced in the content display window 215. That is, the storage unit 411 in which contents and metadata are stored and the storage unit 412 in which combination data is stored and which constitutes the combination data storing means may be connected over a network.

Third parties create many units of combination data, store them in the storage unit 412, and make them public on the network. Then, the user is able to select a desired combination data unit from many for executing the combination operation. More specifically, by creating a combination data program table which lists combination data created by third parties for each content, the user can reference the description in the combination data program table, select combination data of interest, obtain it from the network, combine it with the contents, and reproduce for viewing.

The combination operation includes combination data reproduction, network access using combination data and an operation initiated by the access, a control operation of external unit 316 using combination data, and an execution of a computer program as combination data. The combination operation also includes combination data reproduction, network access and an operations initiated by the access, external unit control, and computer program execution, all initiated selected by the contents of information entered from an external unit.

FIG. 5 is a conceptual diagram showing an example of metadata corresponding to the contents shown in FIG. 4. In the figure, each of the major objects that are individual elements included in the contents in FIG. 4, such as person 1 (woman), person 2 (man), background video, telop, effect sound, background music, and script, has 5W1H information (when, where, who, what, how, what to do) shown in the figure to identify each object (significant items only).

FIG. 6 is a conceptual diagram showing an example of combination interface information corresponding to the contents in FIG. 4 and metadata in FIG. 5.

Referring to the figure, the combination interface information includes a content identifier; reproduction time information that is reproduction elapsed time information represented as "hours: minutes: seconds: milliseconds" from the start of reproduction; content still information that is still screen data at a time corresponding to the reproduction time information, that is, content information that is output information on the contents at a pre-specified time; and metadata that is 5W1H information. In the example in the figure, metadata is represented by numerically coding "words" shown in FIG. 5. For example, metadata is coded as follows: early summer→00010004, plateau→01234567, actress→11223456, golf→01221234, happy→13579012, have a lesson→24680345, effect sound→20406080.

Those who create metadata and those who interpret combination interface information, that is, those who create combination data, are supposed to agree about the correspondence between words and numerical codes in advance. Correspondence data is stored in a storage unit not shown.

FIG. 7 is a conceptual diagram showing an example of combination data corresponding to the combination interface information in FIG. 6. The figure includes, as combination data, a content identifier corresponding to reproduction time information or a word in the 5W1H information included in the combination interface information, contents, URL, content reproducer operation control information, external unit operation control information, and a computer program. That is, combination data is though of as data describing many combinations of a condition and an operation to be executed when the condition is satisfied. A condition is described as a logical expression or an equivalent expression using the contents of combination interface information or information entered from an external unit, whereas an operation is described as any operation executable on a corresponding unit such as computer program execution. Although "words" are used to represent reproduction time information or 5W1H information in the figure, the above description applies also when they are represented by numeric codes.

Next, an example of operation executed by the content combination reproduction system 11 in the embodiment shown in FIGS. 3-7 will be described.

In the content combination reproduction system 11, contents 51 (FIG. 4) and metadata 61 (FIG. 5) stored in the storage unit 411 are reproduced respectively by the content reproducing means 211 and metadata reproducing means 212 in the content reproducer 21 and are output in the content display window 215 and in the metadata display window 216. At the same time, combination interface information (FIG. 6) is generated and, via the combination interface information outputting means 213, output from the content reproducer 21.

The combination processor 31 receives the combination interface information via the combination interface information receiving means 312. After that, the combination interface information, as well as combination data 71 (FIG. 7) stored in the storage unit 412, is sent to the combination operating means 311. Then, based on data entered from the input means 315 attached or externally connected to the system, the combination operation is executed, for example, information (contents in FIG. 7 and so on) is displayed in the combination display window 314 or the external unit 316 is controlled (using external unit operation control information in FIG. 7). At the same time, the combination feedback information generating and outputting 313 generates combination feedback information (content reproduction unit operation control information in FIG. 7) and outputs the generated information from the combination processor 31 to feed it back to the content reproducer 21 from which the combination interface information has been output.

The combination feedback information output from the combination processor 31 is sent to the content reproducer 21 and, via the combination feedback information receiving means 214, sent to the content reproducing means 211 and the metadata reproducing means 212 to control the reproduction of the contents 51 and the metadata 61.

The combination feedback information includes data concerning the operation of the content reproducer 21 including stop/start/pause, reproduction direction (forward/backward), reproduction speed (high, medium, low), skip reproduction, volume control, screen scaling, and channel switching.

The reproduction control of contents and metadata includes the control of the operation of the content reproducer 21 including stop/start/pause, reproduction direction (forward/backward), reproduction speed (high, medium, low), skip reproduction, volume control, screen scaling, and channel switching.

The content combination reproduction system 11 in this embodiment allows an audience to reproduce advertisement contents that correspond to 5W1H information on an object and that are pre-created and stored as combination data, to reproduce advertisement contents by accessing a network based on the identifier of contents stored as combination data, or to reproduce advertisement contents by accessing a web page using the URL of contents stored as combination data. As a result, an advertisement content provider may pay a part or all of the reproduction charge of original contents and metadata on behalf of the audience.

The content combination reproduction system 11 in this embodiment allows an audience to reproduce original-content related service information contents that correspond to 5W1H information on an object and that are pre-created and stored as combination data, to reproduce original-content related service information contents by accessing a network based on the identifier of contents stored as combination data, or to reproduce original-content related service information contents by accessing a web page using the URL of contents stored as combination data. As a result, a service information provider may pay a part or all of the reproduction charge of original contents and metadata on behalf of the audience.

The content combination reproduction system 11 in this embodiment allows an audience to reproduce original-content related information contents that correspond to 5W1H information on an object and that are pre-created and stored as combination data, to reproduce original-content related information contents by accessing a network based on the identifier of contents stored as combination data, or to reproduce original-content related information contents by accessing a web page using the URL of contents stored as combination data. This may also be used to collect membership fees and charges.

The content combination reproduction system 11 in this embodiment allows an audience to reproduce original-content related quiz information contents that correspond to 5W1H information on an object and that are pre-created and stored as combination data, to reproduce original-content related quiz information contents by accessing a network based on the identifier of contents stored as combination data, or to reproduce original-content related quiz information contents by accessing a web page using the URL of contents stored as combination data. It is also possible to suspend the reproduction of original contents and metadata, to allow the audience to enter an answer to a quiz, to determine its result, to discount a part or all of the reproduction charge of original contents and metadata based on the result, and then to restart the reproduction of original contents and metadata.

The content combination reproduction system 11 in this embodiment allows an audience to play an original-content related game that corresponds to 5W1H information on an object and that is pre-created and stored as combination data, to play an original-content related game by accessing a network based on the identifier of contents stored as combination data, or to play an original-content related game by accessing a web page using the URL of contents stored as combination data. It is also possible to suspend the reproduction of original contents and metadata, to discount a part or all of the reproduction charge of original contents and metadata or to collect membership fees or charges based on audience's result of the game while reproducing the original contents and metadata according to the progress of the game, and then to restart the reproduction of original contents and metadata.

The content combination reproduction system 11 in this embodiment allows an audience to replace part or all of data in original contents by original-content related data that corresponds to 5W1H information on an object and that is pre-created and stored as combination data, by original-content related data obtained by accessing a network based on the identifier of contents stored as combination data, or by original-content related data obtained by accessing a web page using the URL of contents stored as combination data and then to reproduce the replaced contents. It is also possible to select reproduction data from original contents or metadata to reproduce the selected data thereafter.

The content combination reproduction system 11 in this embodiment allows an audience to have a chat about original contents by accessing a web page using an original-content related URL that corresponds to 5W1H information on an object and that is pre-created and stored as combination data.

The content combination reproduction system 11 in this embodiment allows an audience to start an original-content related application program that corresponds to 5W1H information on an object and that is pre-created and stored as combination data, to start an original-content related application program obtained by accessing a network based on the identifier of contents stored as combination data, or to start an original-content related application program obtained by accessing a web page using the URL of contents stored as combination data.

The content combination reproduction system 11 in this embodiment allows an audience to have a plurality of units of combination data and to select one or more units of combination data based on combination interface information or on information received from an external unit for concurrent or sequential use.

In the content combination reproduction system 11 in this embodiment, only reproduction time information may be output as reproduction interface information, with combination data corresponding to 5W1H information on an object pre-stored, for executing the combination operation based on the combination data and information entered from an external unit. When only the reproduction time information is output in this way, the combination operation may be executed for the contents, which are the combination data, based on the combination interface information output, additional combination data, and external input information with the pre-stored combination data as the contents. Also, this processing may be repeated with the contents, which are combination data, stored as the combination data.

In the content combination reproduction system 11 in this embodiment, a combination operation may be executed on a particular node on a network and the display information may be sent to a user terminal as the result of the combination operation.

In addition, in the content combination reproduction system 11 in this embodiment, combination data, which corresponds to contents and metadata or only to contents made public on a server, may be placed and made public on another server. A third party may also update a part of metadata and store the updated metadata on the original server and, at the same time, store combination data corresponding to the updated part of metadata on another server.

Next, with reference to FIG. 8 and the following figures, the content combination reproduction system 11 in this embodiment will be described more in detail.

Figure 8:
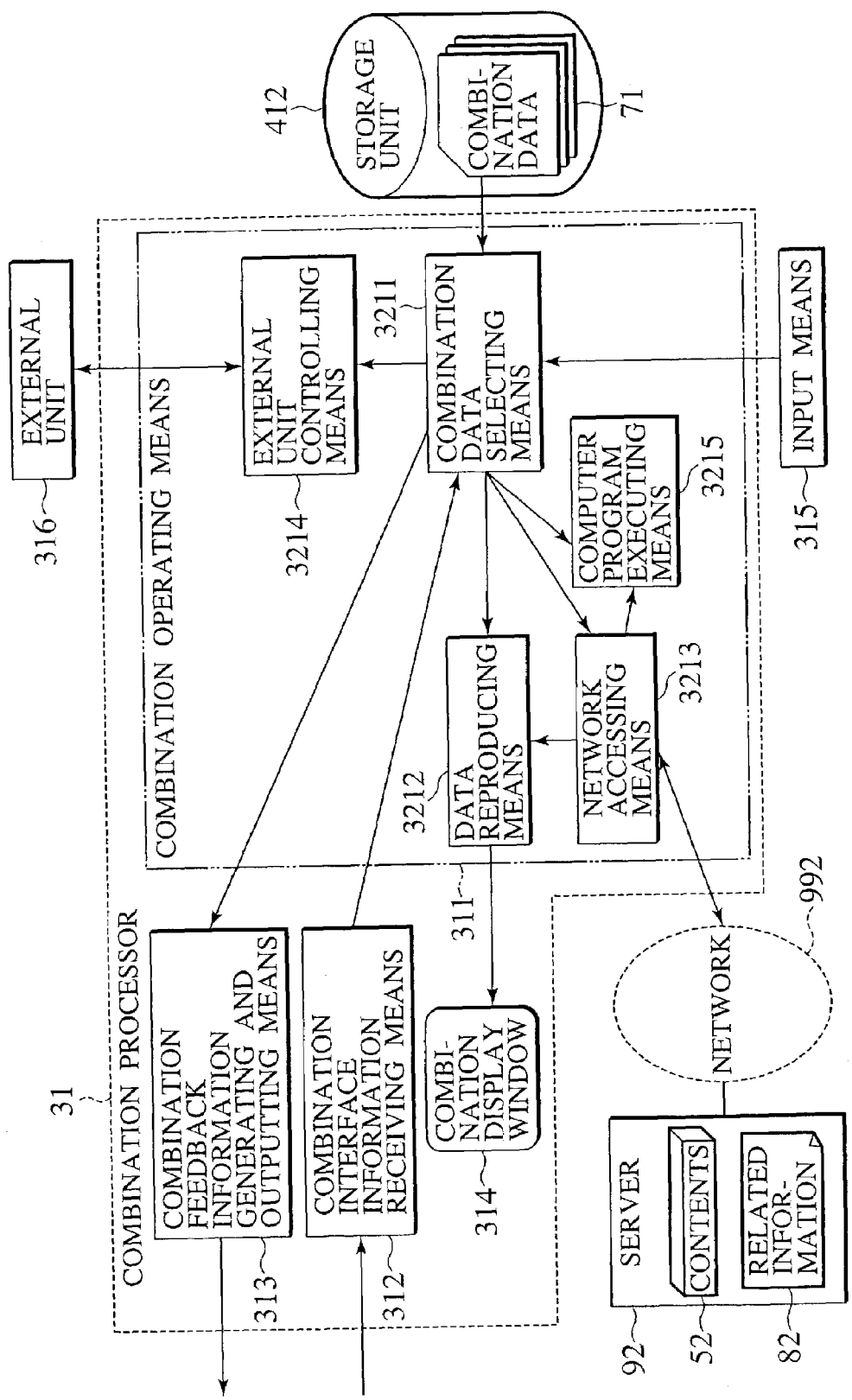
FIG. 8 is a diagram showing the detailed configuration of combination operation means in a combination processor used in the content combination reproduction system in the embodiment shown in FIG. 3.

FIG. 8 is a block diagram showing the detailed configuration of the combination operating means 311 provided in the combination processor 31 of the content combination reproduction system 11 shown in FIG. 3.

As shown in the figure, the combination processor 31 comprises the combination operating means 311, combination interface information receiving means 312, combination feedback information generating and outputting means 313, and combination display window 314. The attached or external input means 315, external unit 316, and storage unit 412 in which the combination data 71 is stored are connected to the combination processor 31. A server 92 in which contents 52 and related information 82 are stored is connected to the combination operating means 311 via a network 992. In addition, the combination operating means 311 comprises combination data selecting means 3211, a data reproducing means 3212, network accessing means 3213, external unit controlling means 3214, and computer program executing means 3215.

Next, with reference to FIG. 8 and FIGS. 6 and 7, the combination operation of the content combination reproduction system 11 in this embodiment will be described.

In the combination processor 31 shown in FIG. 8, the combination interface information (FIG. 6) entered from an external unit via the combination interface information receiving means 312 is sent to the combination data selecting means 3211 in the combination operating means 311. On the other hand, the corresponding combination data 71 (FIG. 7) stored in the storage unit 412 is also sent to the combination data selecting means 3211. Input data is entered from the input means 315 to the combination data selecting means 3211. Based on those input contents, the combination data selecting means 3211 executes the following various combination operations.

(0) Selects, based on a content identifier in the combination interface information (FIG. 6), combination data 71, for example, combination data with the corresponding identifier, from the combination data group (FIG. 7) stored in the storage unit 412.

(1) Finds that the 5W1H information "Golf" in the first row of the combination data (FIG. 7) matches the code "01221234" (corresponds to "Golf" as described above) in the METADATA/WHAT column included in combination interface information (FIG. 6) No. 1, sends data in the Content column in the first row of the combination data (FIG. 7) (for example, advertisement video of golf club) to the data reproducing means 3212, and outputs the advertisement in the combination display window 314.

(2) Finds that the condition indicated by the 5W1H information "Golf & Lesson" in the second row of the combination data (FIG. 7) corresponds to the code "01221234" (corresponds to "Golf" as described above) in the METADATA/WHAT column and the code "24680345" (corresponds to "Have lesson" as described above) in the METADATA/WHAT TO DO column included in combination interface information (FIG. 6) No. 1, sends the content identifier data (cid: 01234680) in the CONTENT IDENTIFIER column in the second row of the combination data (FIG. 7) to the network accessing means 3213, obtains the contents 52 (for example, advertisement video of golf lesson) corresponding to the identifier from the server 92 via the network 992, and outputs the obtained contents in the combination display window 314 via the data reproducing means 3212. At the same time, the computer program (Golf.exe) in the COMPUTER PROGRAM column in the second row of the combination data (FIG. 7) is sent to the computer program executing means 3215 for execution.

(3) Finds that the 5W1H information "Golf" in the first row of the combination data (FIG. 7) matches the code "01221234" (corresponds to "Golf" as described above) in the METADATA/WHAT column included in combination interface information (FIG. 6) No. 1, sends the URL data (http://www.xyz.golf.com/) in URL column in the first row of the combination data (FIG. 7) to the network accessing means 3213, obtains the contents 52 (for example, advertisement video of golf club) from the server 92 via the network 992, and outputs the obtained video in the combination display window 314 via the data reproducing means 3212. At this time, if the content 52 obtained via the network is a computer program, the computer program is sent to the computer program executing means 3215 for execution.

(4) Finds that the 5W1H information "Actress A" in the fourth row of the combination data (FIG. 7) matches the code "11223456" (corresponds to "Actress A" as described above) in the METADATA/WHO column included in combination interface information (FIG. 6) No. 1 and sends data (for example, preview video of movie in which actress A appears) in the CONTENT COLUMN in the fourth row of the combination data (FIG. 7) to the data reproducing means 3212 for display in the combination display window 314. The combination data selecting means 3211 also sends the URL data (http://www.aaa.bbb.com/A/index.html) in the URL column in the fourth row of the combination data (FIG. 7) to the network accessing means 3213, obtains the contents 52 about "Actress A" (for example, information on movie in which actress A plays the leading role) from the server 92 via the network 992, and outputs the obtained contents in the combination display window 314 via the data reproducing means 3212. The combination data selecting means 3211 also sends the content identifier data (cid: 0246001122) in the CONTENT IDENTIFIER column in the fourth row of the combination data (FIG. 7) to the network accessing means 3213, obtains the contents 52 related to "Actress A" (for example, preview video of movie in which actress A appears) corresponding to the identifier from the server 92 via the network 992, and outputs the obtained contents in the combination display window 314 via the data reproducing means 3212. At the same time, the combination data selecting means 3211 sends the coded or un-coded contents (1. Pause, 2. 45-second timekeeping, 3. Restart) of the CONTENT REPRODUCER OPERATION CONTROL INFORMATION column in the fourth row of the combination data (FIG. 7) to the content reproducer 21, which is external to the combination processor 31, via the combination feedback information generating and outputting means 313 to control the reproduction of original contents (contents in the output source of combination interface information) based on the contents.

(5) Finds that the reproduction time information "Reproduction elapsed time is 00:01:00.000" in the fifth row of the combination data (FIG. 7) matches "00:01:00.000" in the REPRODUCTION TIME INFORMATION column included in combination interface information (FIG. 6) No. 2 and sends data (for example, commercial video) in the CONTENT COLUMN in the fifth row of the combination data (FIG. 7) to the data reproducing means 3212 for display in the combination display window 314. The combination data selecting means 3211 also sends the URL data (http://www.bbb.ccc.com/000100/) in the URL column in the fifth row of the combination data (FIG. 7) to the network accessing means 3213, obtains the related service information contents 52 (for example, travel guide information about original contents) from the server 92 via the network 992, and outputs the obtained contents in the combination display window 314 via the data reproducing means 3212. The combination data selecting means 3211 also sends the content identifier data (cid: 0111223344) in the CONTENT IDENTIFIER column in the fifth row of the combination data (FIG. 7) to the network accessing means 3213, obtains the related service information contents 52 corresponding to the identifier from the server 92 via the network 992 (for example, community information included in original contents), and outputs the obtained contents in the combination display window 314 via the data reproducing means 3212. At the same time, the combination data selecting means 3211 sends the coded or un-coded contents (1. Pause, 2. 30-second timekeeping, 3. Restart) of the CONTENT REPRODUCER OPERATION CONTROL INFORMATION column in the fifth row of the combination data (FIG. 7) to the content reproducer 21, which is external to the combination processor 31, via the combination feedback information generating and outputting means 313 to control the reproduction of original contents (contents in the output source of combination interface information) based on the contents.

(6) Finds that the condition indicated by the reproduction time information or 5W1H information "Reproduction elapsed time is later than 00:30:00.000 & effect sound" in the seventh row of the combination data (FIG. 7) corresponds to the value "00:40:00.000" in the REPRODUCTION TIME INFORMATION column included in combination interface information (FIG. 6) No. 7 and to the code "20406080" (corresponds to "effect sound" as described above) in the META-DATA/WHAT column, sends the URL data (http://www.qwerty.com/sound/0030/) in the URL column in the seventh row of the combination data (FIG. 7) to the network accessing means 3213, obtains the related service information contents 52 from the server 92 via the network 992 (for example, graphic video that works with original contents to generate multiplier effect), and outputs the obtained contents in the combination display window 314 via the data reproducing means 3212. At the same time, the combination data selecting means 3211 sends the coded or un-coded contents (1. SW on, 2. SW off, 3. Repeat 3 times) in the EXTERNAL UNIT OPERATION CONTROL INFORMATION column in the seventh row of the combination data (FIG. 7) to the external unit 316 via the external unit controlling means 3214 to control the unit based on the contents.

Next, with reference to FIG. 9, an example of content charge payment flow in the content combination reproduction system 11 in this embodiment will be described. Referring to the figure, contents are sent from a content provider system 710 to the content combination reproduction system 11 (step S110). Advertisement contents, which are included in the combination data in advance or transferred over a network based on information in the combination data as described above, are sent from an advertisement content provider system 740, and then the audience views the contents (step S130). When the advertisement contents are transferred over the network based on the information in the combination data, usage information on the contents provided by the content provider system 710 may be collected.

Next, content usage information on the contents provided by the content provider system 710 is sent from the advertisement content provider system 740 to a content charge settlement system 720 (step S150). In some cases, when advertisement contents provided by the advertisement content provider system 740 are associated with the contents provided by the content provider system 710 as the combination data, content usage information containing a fixed charge is sent to the content charge settlement system 720 regardless of whether or not the audience views the contents provided by the content provider system 710.

The content charge settlement system 720 calculates the content charge based on the content usage information sent from the advertisement content provider system 740, requests a payment system 730 to transfer the content charge from an advertisement content provider's account e32 and, after completion of the transfer, receives a notification indicating that the transfer is completed (step S170). The content charge settlement system 720 sends the content charge, collected from the advertisement content provider, and its notification to the content provider system 710 (step S190).

Next, with reference to FIG. 10, an example of content charge payment flow in the content combination reproduction system 11 in this embodiment, which is different from that shown in FIG. 9, will be described. Referring to the figure, contents are sent from the content provider system 710 to the content combination reproduction system 11 (step S110). Service information contents, which are included in the combination data in advance or transferred over a network based on information in the combination data as described above, are sent from a service information provider system 750, and then the audience views the contents (step S132). When the service information contents are transferred over the network based on the information in the combination data, usage information on the contents provided by the content provider system 710 may be collected.

Next, content usage information on the contents provided by the content provider system 710 is sent from the service information provider system 750 to the content charge settlement system 720 (step Sl52). In some cases, when service information contents provided by the service information provider system 750 are associated with the contents provided by the content provider system 710 as the combination data, content usage information containing a fixed charge is sent to the content charge settlement system 720 regardless of whether or not the audience views the contents provided by the content provider system 710.

The content charge settlement system 720 calculates the content charge based on the content usage information sent from the service information provider system 750, requests the payment system 730 to transfer the content charge from a service information content provider's account e42 and, after completion of the transfer, receives a notification indicating that the transfer is completed (step S170). The content charge settlement system 720 sends the content charge, collected from the service information content provider, and its notification to the content provider system 710 (step S190).

Figure 9:
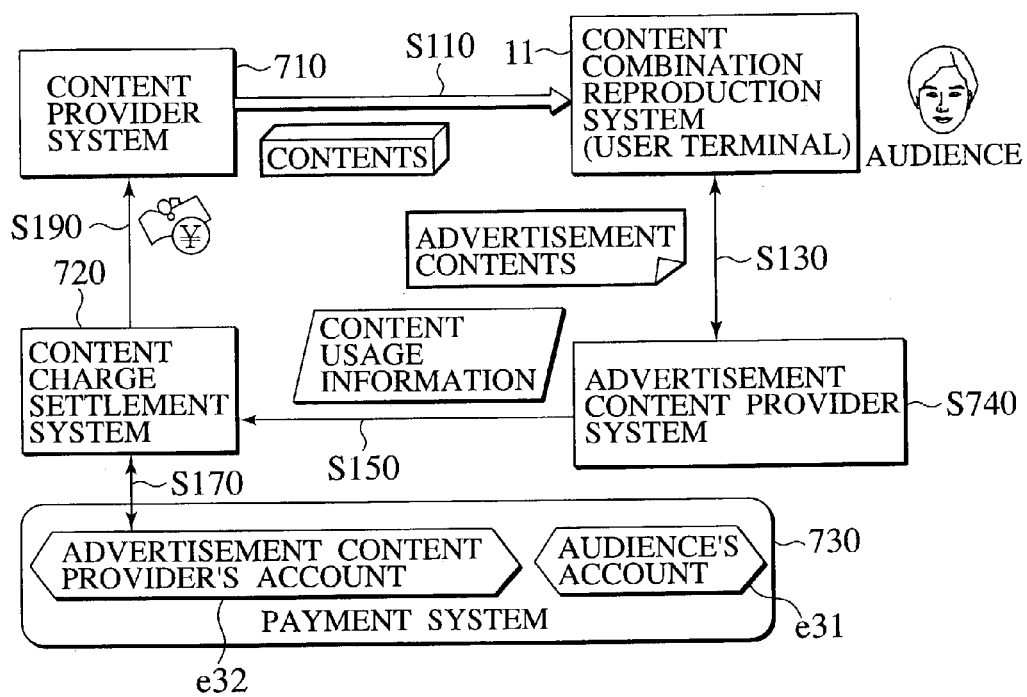
FIG. 9 is a diagram showing an example of content charge payment processing in the content combination reproduction system in the embodiment shown in FIG. 3.
Figure 10:
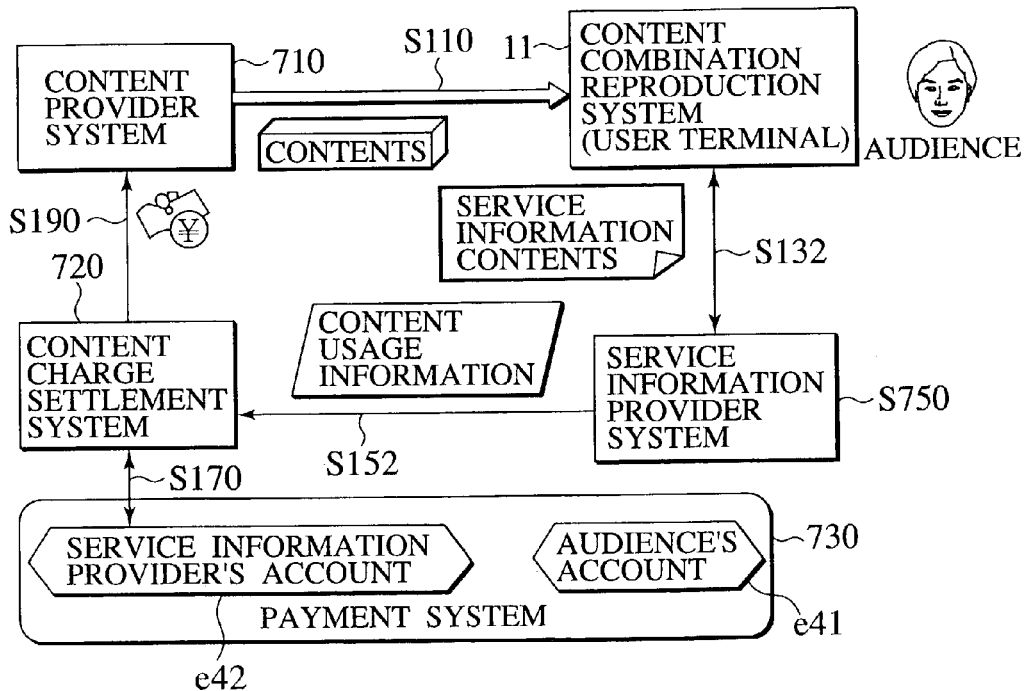
FIG. 10 is a diagram showing another example of content charge payment processing in the content combination reproduction system in the embodiment shown in FIG. 3.

In the content charge payment flow examples in FIGS. 9-10, the advertisement content provider or the service information provider pays all of the content usage charge. In some cases, those providers pay part of the charge and the audience pays the rest.

Figure 11:
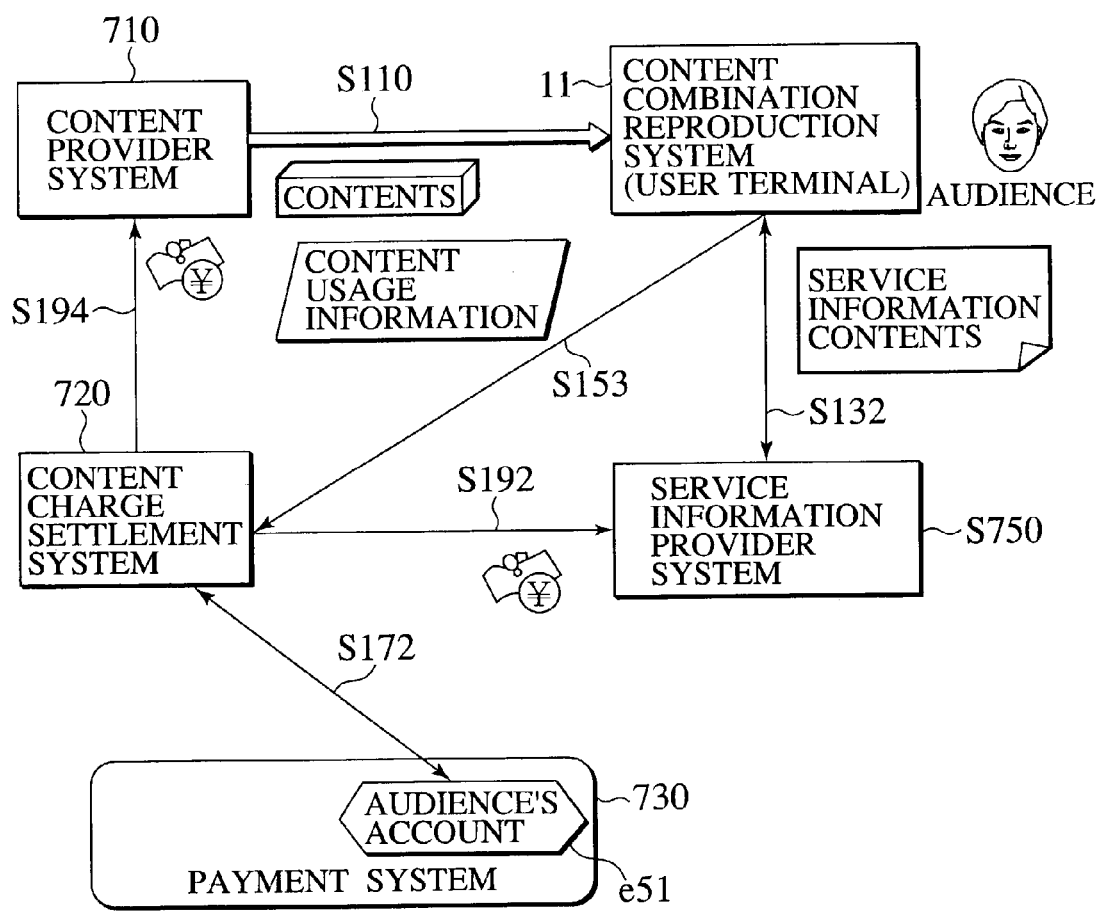
FIG. 11 is a diagram showing an example of related information content charge payment processing in the content combination reproduction system in the embodiment shown in FIG. 3.

Next, with reference to FIG. 11, an example of related-information content charge payment flow in the content combination reproduction system in this embodiment will be described. Referring to the figure, contents are sent from the content provider system 710 to the content combination reproduction system 11 (step S110). Service information contents, which are included in the combination data in advance or transferred over a network based on information in the combination data as described above, are sent from the service information provider system 750, and then the audience views the contents (step S132). At this time, content charge information on the service information contents is collected in the content combination reproduction system 11.

Next, content usage information on the service information contents provided by the service information provider system 750 is sent from the content combination reproduction system 11 to the content charge settlement system 720 (step S153). The content charge settlement system 720 calculates the content charge based on the content usage information sent from the content combination reproduction system 11, requests the payment system 730 to transfer the content charge from an audience's account e51 of the service information content audience who used the content combination reproduction system and, after completion of the transfer, receives a notification indicating that the transfer is completed (step S172).

The content charge settlement system 720 sends the content charge, collected from the audience, and its notification to the service information provider system 750 (step S192). In addition, in some cases, the content charge settlement system 720 sends part of the content charge, collected from the audience, and its notification to the content provider system 710 as the price for associating the service information contents provided by the service information provider system 750 with the contents provided by the content provider system 710 (step S194).

Figure 12:
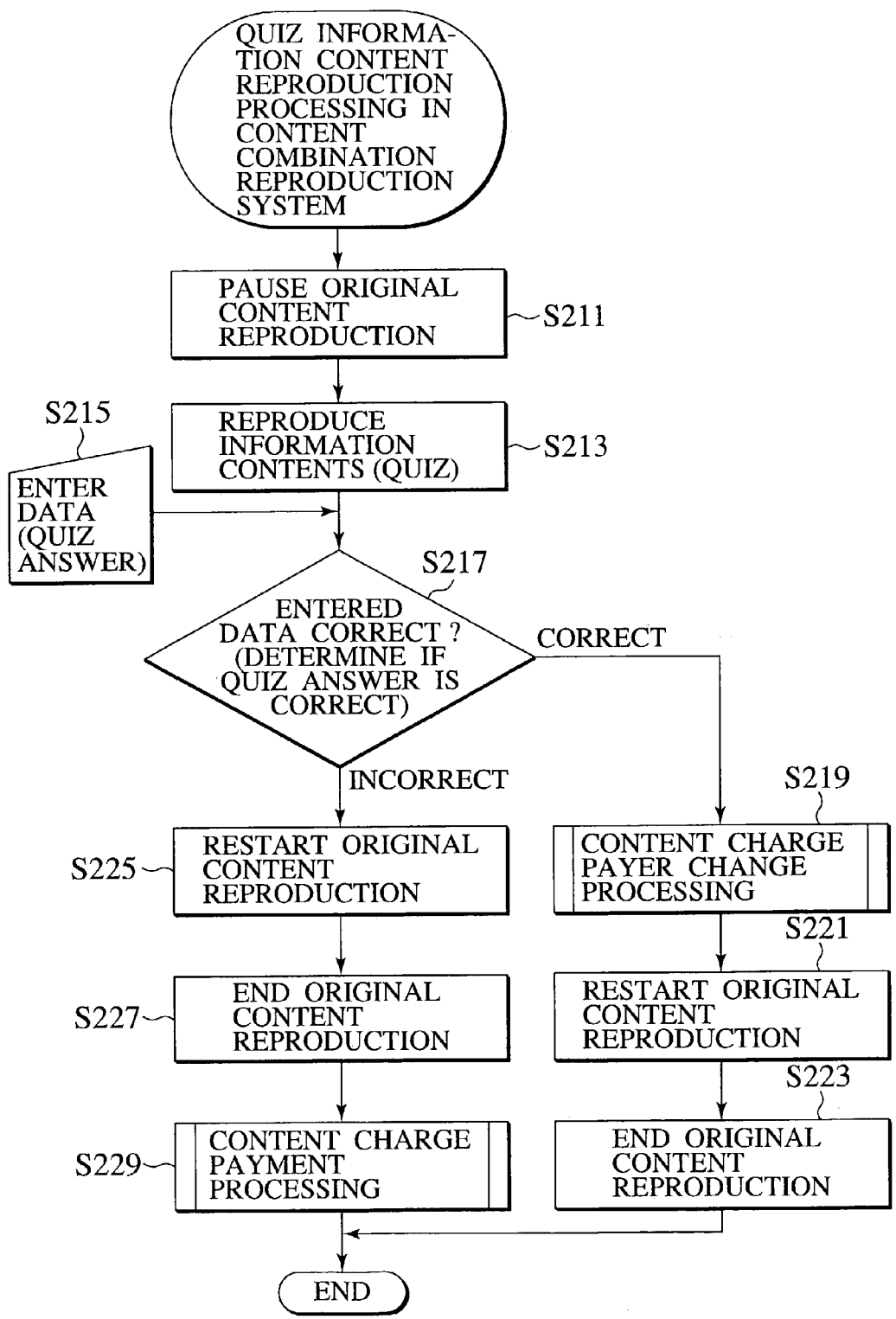
FIG. 12 is a flowchart showing an example of quiz information content reproduction processing in the content combination reproduction system in the embodiment shown in FIG. 3.

Next, with reference to the flowchart shown in FIG. 12, quiz information content reproduction processing in the content combination reproduction system in this embodiment will be described. In the description, the content combination reproduction system 11 in FIG. 3 and the combination data in the sixth row in FIG. 7 are used. Assume that the contents (1. Pause, 2. Wait to enter, 3. Restart) in the CONTENT REPRODUCER OPERATION CONTROL INFORMATION column in the sixth row in FIG. 7 are sent to the content reproducer 21 as the combination feedback information.

The content reproducer 21 pauses the reproduction of the original contents based on "1. Pause" in the combination feedback information (step S211). From this time on, the content reproducer 21 waits for the audience to enter data based on "2. Wait to enter" in the combination feedback information.

The combination processor 31 reproduces the contents in the combination data (CONTENT COLUMN in the sixth row in FIG. 7) as the information contents (quiz) and displays the reproduced contents in the combination display window 314 (step S213). The audience enters an answer to the quiz from the input means 315 (step S215). The content reproducer 21 checks the entered data (answer to the quiz) based on the content information in the combination data (step 217) and, if the answer is correct, changes the original content charge payer from the audience to the combination data (quiz) provider (step S219). The content reproducer 21 restarts the reproduction of the original contents based on "3. Restart" in the combination feedback information (step S221). The content reproducer 21 ends the reproduction of the original contents (step S223).

If the answer to the quiz is incorrect as the result of checking in step S217, the content reproducer 21 restarts the reproduction of the original contents based on "3. Restart" in the combination feedback information (step S225). The content reproducer 21 ends the reproduction of the original contents (step S227). The audience pays the content charge for the original contents (step S229).

Figure 13:
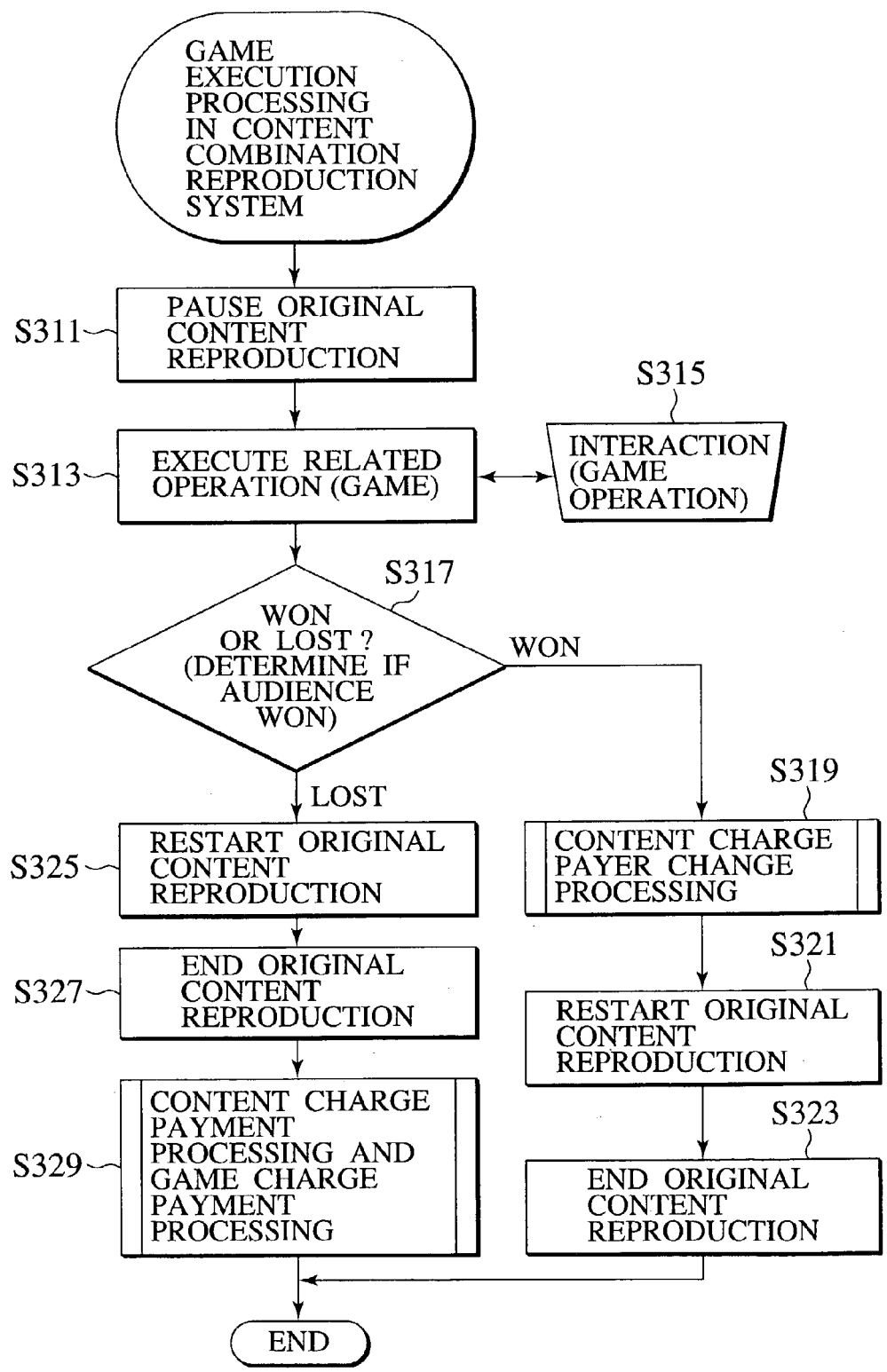
FIG. 13 is a flowchart showing an example of game execution processing in the content combination reproduction system in the embodiment shown in FIG. 3.

Next, with reference to the flowchart shown in FIG. 13, game execution processing in the content combination reproduction system in this embodiment will be described. In the description, the content combination reproduction system in FIG. 3 and the combination data in the sixth row in FIG. 7 are used. Assume that the contents (1. Pause, 2. Wait to enter, 3. Restart) in the CONTENT REPRODUCER OPERATION CONTROL INFORMATION column in the sixth row in FIG. 7 are sent to the content reproducer 21 as the combination feedback information.

The content reproducer 21 pauses the reproduction of the original contents based on "1. Pause" in the combination feedback information (step S311). From this time on, the content reproducer 21 waits for the audience to enter data based on "2. Wait to enter" in the combination feedback information.

The combination processor 31 executes the program (Game.exe) in the combination data (COMPUTER PROGRAM column in the sixth row in FIG. 7) as the related operation (game) (step S313). The audience executes the game operation from the input means 315 while viewing the game screen displayed in the combination display window 314 (step S315).

The combination processor 31 checks the result of the game (execution result of combination operation) based on the game status up to this time and on the last-entered data (step S317). If it is found that the audience won the game as the result of this checking, the combination processor 31 changes the original content charge payer from the audience to the combination data (game) provider (step S319).

The content reproducer 21 restarts the reproduction of the original contents based on "3. Restart" in the combination feedback information (step S321). The content reproducer 21 ends the reproduction of the original contents (step S323).

On the other hand, if it is found that the audience lost the game as the result of checking in step S317, the content reproducer 21 restarts the reproduction of the original contents based on "3. Restart" in the combination feedback information (step S325). The content reproducer 21 ends the reproduction of the original contents (step S327). The audience pays the original content charge and the game execution charge (step S329).

Figure 14:
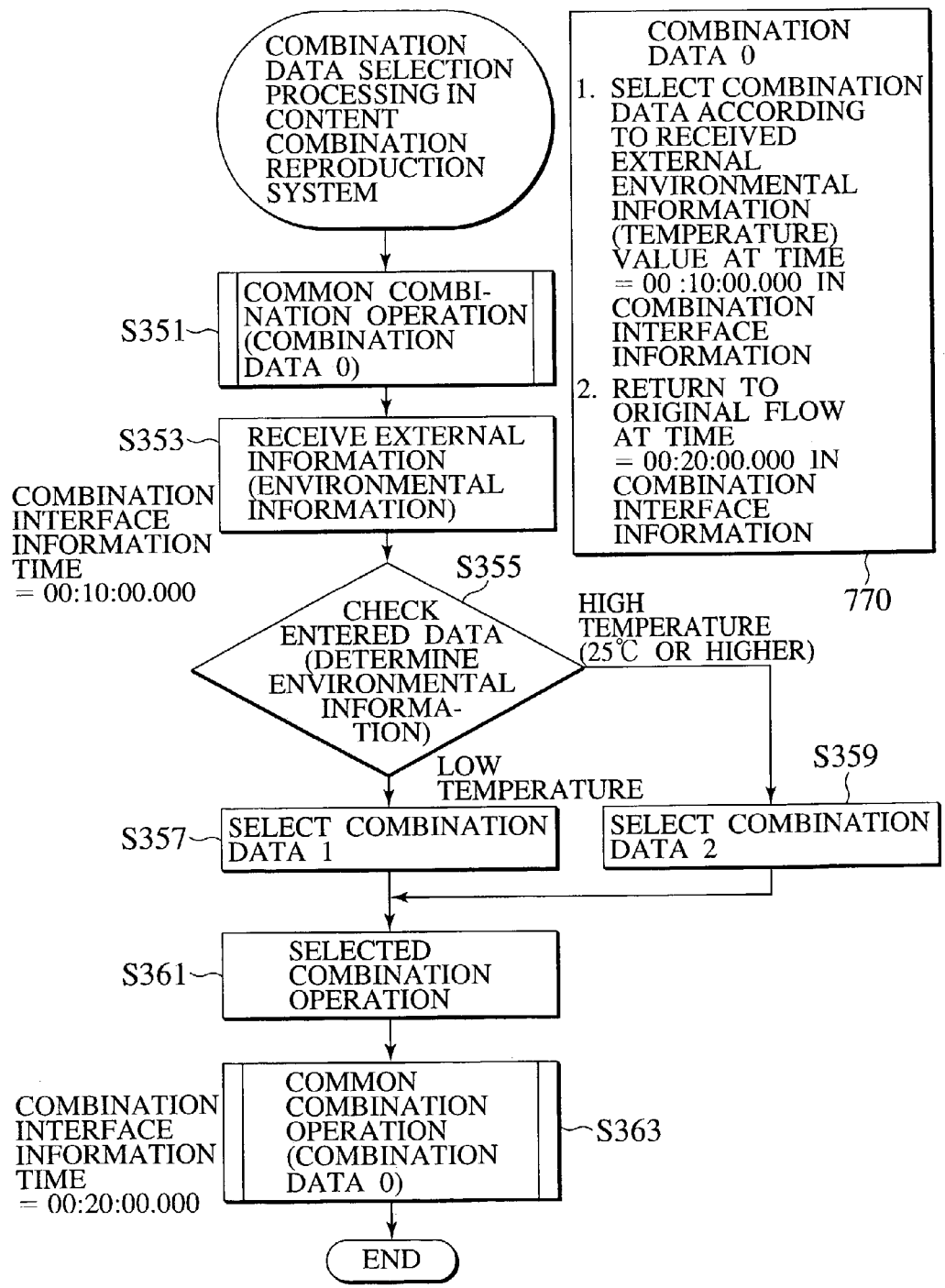
FIG. 14 is a flowchart showing an example of combination data selection processing in the content combination reproduction system in the embodiment shown in FIG. 3.
Figure 15:
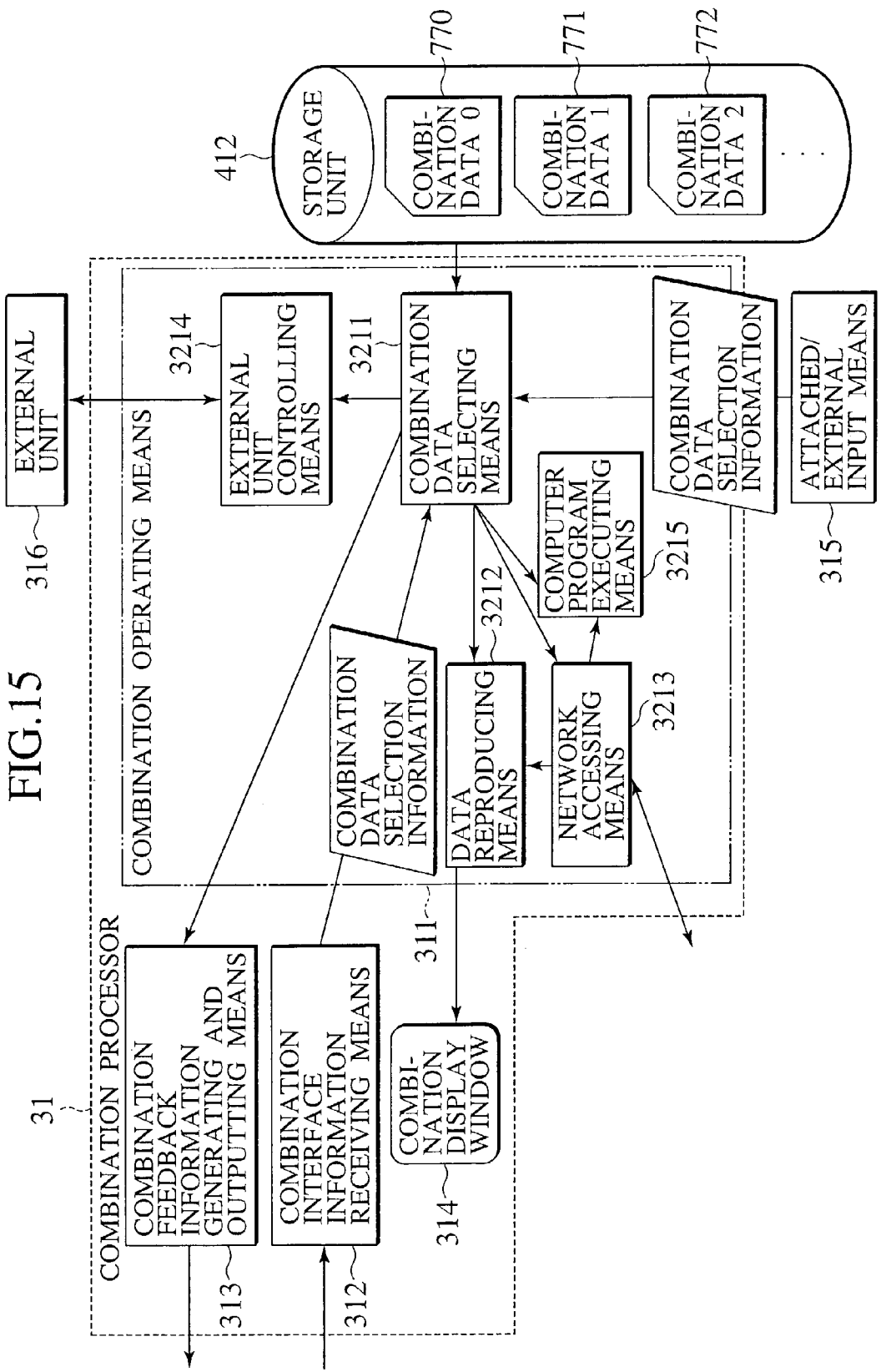
FIG. 15 is a diagram showing an example of the configuration in which combination data selection processing is executed in the content combination reproduction system in the embodiment shown in FIG. 3.

Next, with reference to the flowchart shown in FIG. 14, combination data selection processing in the content combination reproduction system in this embodiment will be described while referring to the combination processor 31 shown in FIG. 15. Assume that the combination processor 31 in FIG. 15 has the configuration shown in FIG. 8 and that the storage unit 412 stores combination data 0-2 (770-772).

First, the combination processor 31 performs operation according to combination data 0 (770) (step S351). Based on the contents of combination data 0 (770) (1. Select data according to received external environmental information (temperature) value at time=00:10:00.000 in combination interface information), the combination processor 31 obtains combination data selection information (environmental information=temperature) from the input means 315 when the combination interface information time (reproduction elapsed time) is 00:10:00.000 (step S353).

Next, the combination processor 31 checks the entered combination data selection information (environmental information=temperature) (step S355). If it is found as the result of this checking that the temperature is low, combination data 1 (771) is selected as the subsequent combination data (step S357). On the other hand, if it is found as the result of this checking that the temperature is high (25° C. or higher), combination data 2 (772) is selected as the subsequent combination data (step S359).

Then, the combination processor 31 executes the combination operation based on the combination data selected as described above (step S361). Based on the contents of combination data 0 (770) (2. Return to original flow at time=00:20:00.000 in combination interface information), the combination processor 31 executes the combination operation based on combination data 0 after the combination interface information time (reproduction elapsed time) reaches 00:20:00.000 (step S363).

Figure 16:
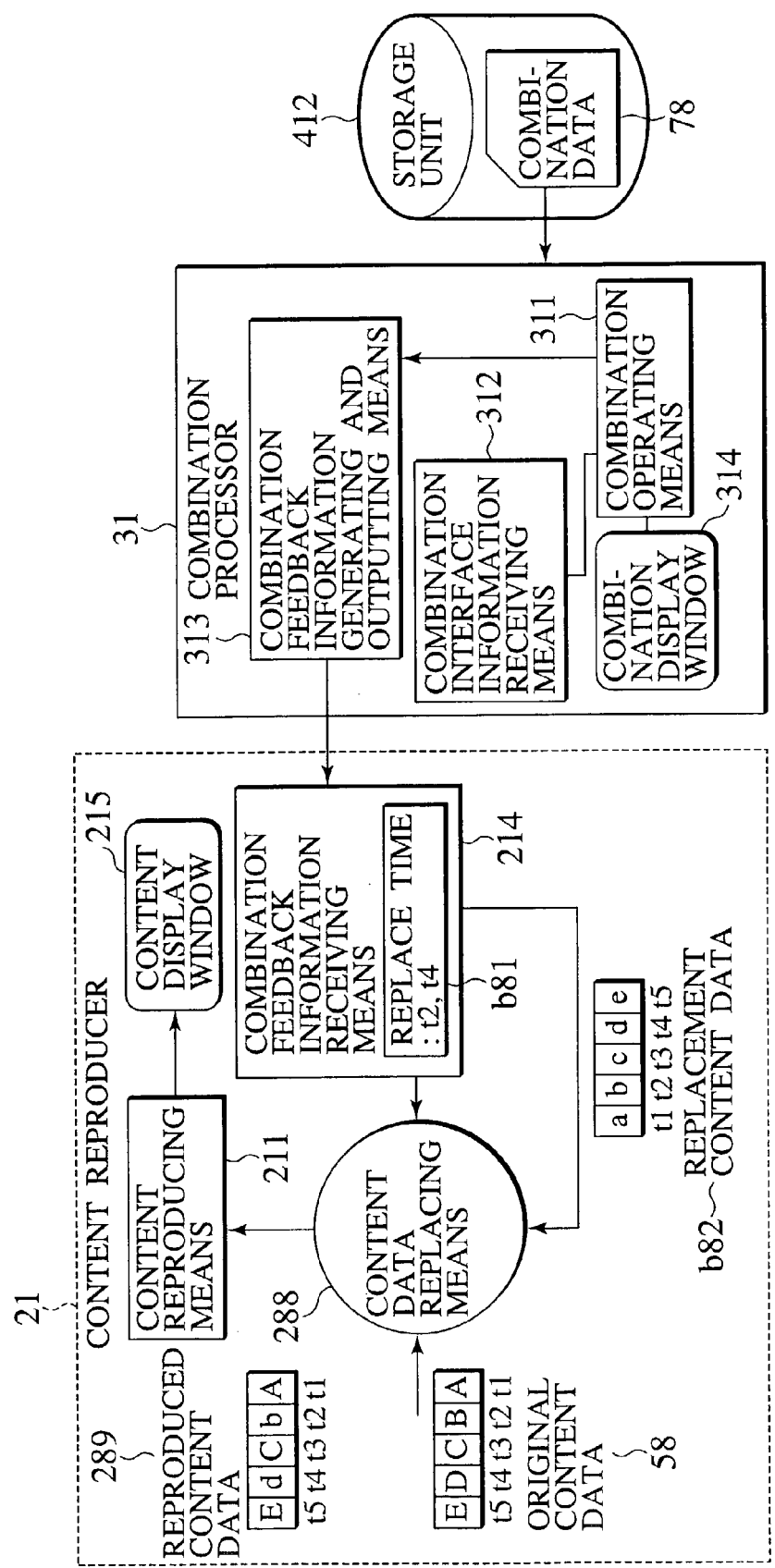
FIG. 16 is a diagram showing an example of contents replacement processing in the content combination reproduction system in the embodiment shown in FIG. 3.

Next, with reference to FIG. 16, content data replacement processing in the content combination reproduction system in this embodiment will be described.

Referring to the figure, combination feedback information generated and output by the combination operating means 311 and the combination feedback information generating and outputting means 313 based on combination data 78 stored in the storage unit 412 connected to the combination processor 31 includes replacement times b81 (t2, t4) and replacement content data b82 (a, b, c, d, and e for times t1-t5).

This combination feedback information is input to the content reproducer 21 and is input to content data replacing means 288 via the combination feedback information receiving means 214.

Based on original content data 58 (A, B, C, D, and E for times t1-t5), the replacement times b81, and the replacement content data b82, the content data replacement means 288 executes replacement processing and generates reproduced content data 289 (A, b, C, d, and E for times t1-t5), sends the generated content data to the content reproducing means 211, and displays them in the content display window 215.

Figure 17:
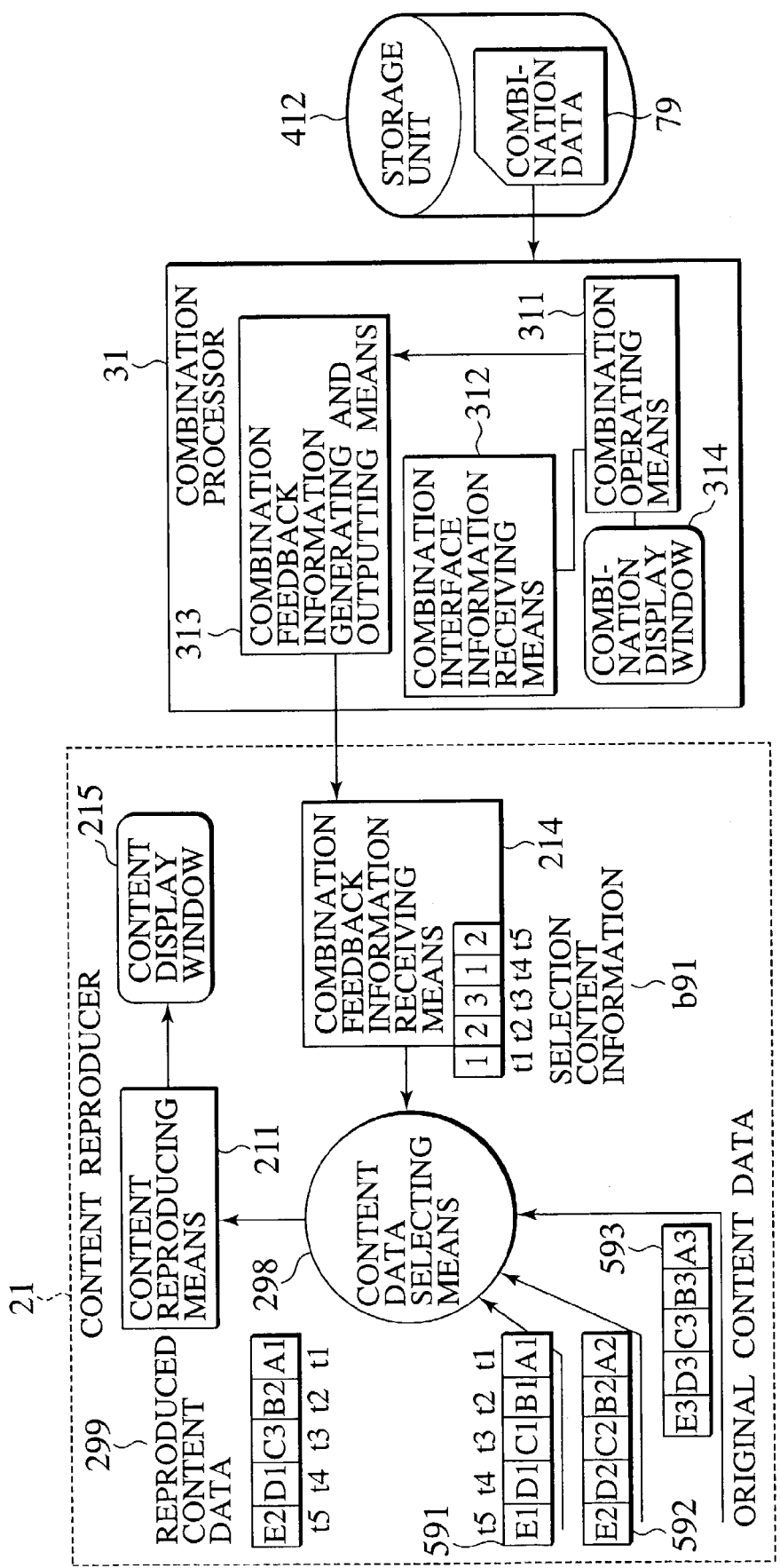
FIG. 17 is a diagram showing an example of selection content data reproduction processing in the content combination reproduction system in the embodiment shown in FIG. 3.

Next, with reference to FIG. 17, selection content data reproduction processing in the content combination reproduction system in this embodiment will be described.

Referring to the figure, combination feedback information generated and output by the combination operating means 311 and the combination feedback information generating and outputting means 313 based on combination data 79 stored in the storage unit 412 connected to the combination processor 31 includes selection content information b91 (1, 2, 3, 1, and 2 for times t1-t5). This combination feedback information is input to the content reproducer 21 and is input to content data selecting means 298 via the combination feedback information receiving means 214.

Based on three units of original content data 591 (A1, B1, C1, D1, and E1 for times t1-t5), 592 (A2, B2, C2, D2, and E2 for times t1-t5), and 593 (A3, B3, C3, D3, and E3 for times t1-t5) and the selection content information b91, the content data selecting means 298 executes selection processing and generates reproduced content data 299 (A1, B2, C3, D1, and E2 for times t1-t5), sends the generated content data to the content reproducing means 211, and displays them in the content display window 215.

Figure 18:
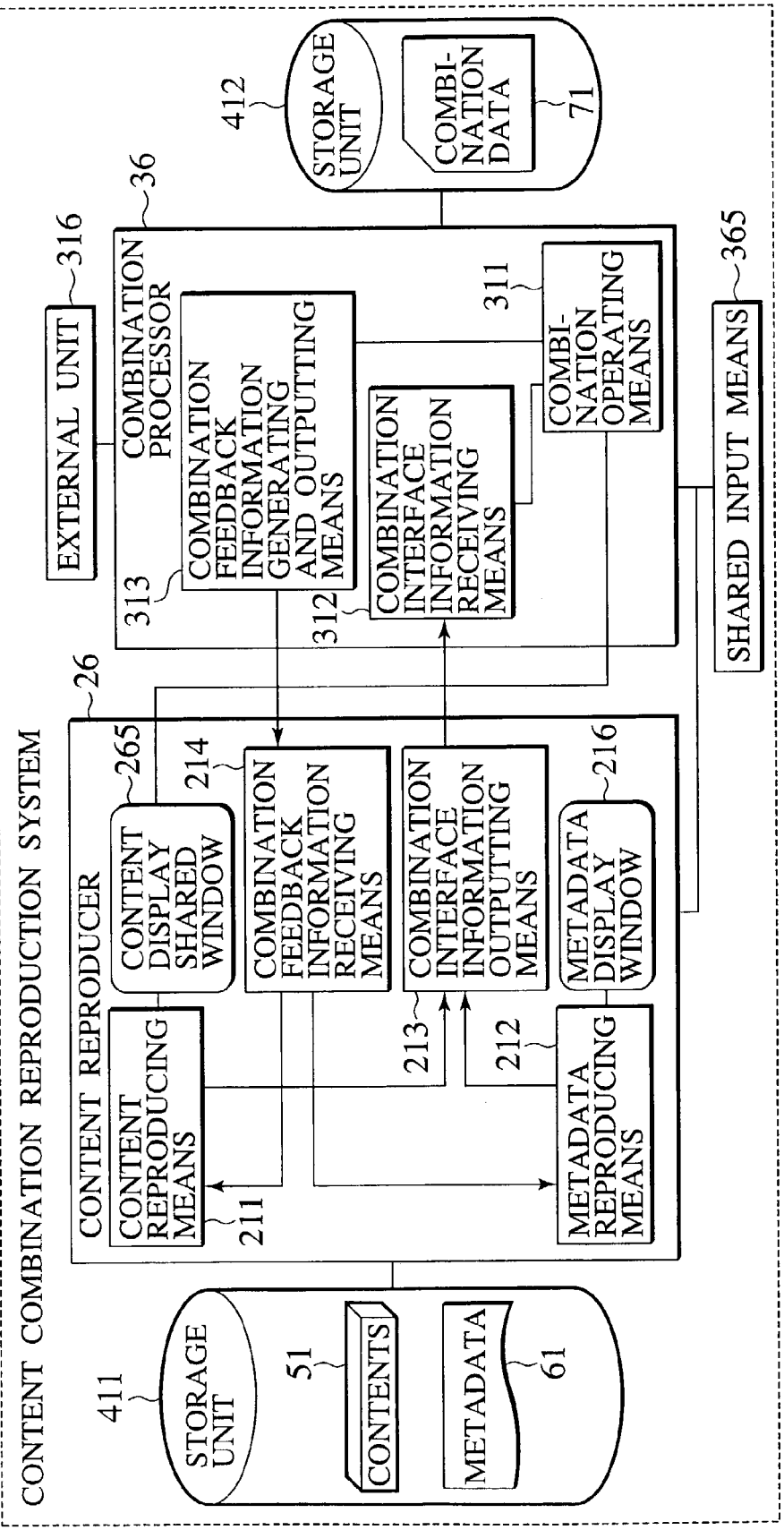
FIG. 18 is a block diagram showing a system configuration in which the content display shared window and the shared input means are shared in the content combination reproduction system in the embodiment shown in FIG. 3.

Next, with reference to FIG. 18, an example of component sharing in the content combination reproduction system in this embodiment will be described.

A content combination reproduction system 16 shown in the figure comprises a content reproducer 26, a combination processor 36, a storage unit 411 in which contents 51 and metadata 61 are stored and which is connected to the content reproducer 26, a storage unit 412 in which combination data 71 is stored and which is connected to the combination processor 36, attached or external shared input means 365, and an external unit 316. The content reproducer 26 comprises content reproducing means 211, metadata reproducing means 212, combination interface information outputting means 213, combination feedback information receiving means 214, a content display shared window 265, and a metadata display window 216. The combination processor 36 comprises combination operating means 311, combination interface information receiving means 312, and combination feedback information generating and outputting means 313. As compared with the content combination reproduction system 11 in FIG. 3, the content display shared window 265 and the shared input means 365 are shared by the content reproducer 26 and the combination processor 36.

FIG. 19 is a conceptual diagram showing an example of combination data corresponding only to reproduction time information in this embodiment. The following describes the combination data in FIG. 19 by comparing it with the example of combination data shown in FIG. 7.

Referring to FIG. 19, a table listing the correspondence between the reproduction times of original contents and the 5W1H information on the object appearing at a particular time is created before creating combination data corresponding to the original contents. Therefore, "Mount Fuji" is specified, for example, for the 5W1H information as the combination data corresponding to the object "Mount Fuji" (third row in FIG. 7), and the row (third row in FIG. 19) corresponding to the reproduction time t1 at which "Mount Fuji" will appear is specified. This will eliminate the need for dynamically comparing the combination data with the combination interface information.

The present invention has been described without referring to particular content types but with the most complex video contents in mind. However, it is apparent that the present invention is applicable to any type of contents and combination data. In fact, the present invention is applicable to an unlimited number of combinations; for example, narrative text and background music (BGM) may be combined with contents in which a plurality of still images are arranged on a time-series basis, or BGM and illustrations (still images) maybe combined with electronic book contents (text and sound).

It is easily understood that, by building into a computer system a recording medium such as a CD (Compact Disc) or a FD (Floppy Disk) on which the processing procedure for the content combination reproduction method in the embodiment described above is recorded as a program, by downloading the program from a recording medium to a computer system via a communication line, or by installing the program from a recording medium, the computer can work as a content combination reproducer that executes the content combination reproduction method by executing the program thereon. This type of recording medium, if available, would make it easy to distribute the content combination reproduction method of the present invention.

As described above, the present invention obtains contents and metadata, reproduces the contents and metadata, and generates combination interface information defining information necessary for the combination operation on the contents. This makes it possible to execute the combination operation while reproducing contents and metadata with the use of the combination interface information and to provide various types of content related information and various services including games.

The present invention obtains combination data from a combination data storage unit, follows the definition of the combination data based on combination interface information and, as necessary, controls the execution of combination operation on the contents using information entered from an external unit. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the content distribution related business, and bring about an important economic effect.

In addition, the present invention generates combination feedback information that controls the reproduction operation of contents and metadata and controls the content reproduction operation based on the combination feedback information. This makes it possible to flexibly execute the combination operation, including the provision of various types of content related information, services, and games, while reproducing the contents and metadata and, by making the combination interface information public, allows the combination data prepared not only by the content provider and providers which have obtained permission from the content provider but also by a third party to be made available to provide unique combination operation services including the provision of additional information, services and games. Those advantages increase the number of accesses to the original contents, allow the user to enjoy a variety of content related services, activate the content distribution related business, and bring about an important economic effect.

The present invention allows the user to obtain at least one unit of information as the combination data from advertisement contents, content related service information, content related information contents, content related quiz information, and content related game information, controls the execution of combination operation related to said at least one unit of information, and charges the provider of said at least one of information for all or part of the combination operation based on said at lest one information and combination operation or its operation result. Therefore, when advertisement contents, content related service information, information contents, quiz information, or game information is provided, the information provider is requested to pay the charge and the user is able to obtain a variety of information at no charge.

It should be understood that many modifications and adaptations of the invention will become apparent to those skilled in the art and it is intended to encompass such obvious modifications and changes in the scope of the claims appended hereto.

What is claimed is:

1. A content combination reproducer capable of providing content related information and services as a combination operation while reproducing contents and metadata, wherein the metadata includes at least one of the following six pieces of 5W1H information: when, where, who, what, how, and what to do, and wherein the metadata is associated with an object included in one frame of the contents, said content combination reproducer comprising:

content reproducing means for obtaining the contents and the metadata attached to the contents to reproduce the contents and the metadata;

combination interface information generating means for generating combination interface information that includes content reproduction times, data on the one frame of the contents, and metadata associated with the object included in the one frame of the contents, and wherein the combination interface information defines information necessary for executing the combination operation on the contents when said content reproducing means obtains the contents and the metadata;

combination data storing means for storing therein combination data that corresponds to the combination interface information, and wherein the combination data defines an operation related to the contents; and combination operation controlling means for obtaining the combination data stored in said combination data storing means to control an execution of the combination operation on the contents after a defining of the combination data based on the combination interface information and by using external input information entered from an external unit as necessary.

2. The content combination reproducer according to claim 1, further comprising:

combination feedback information generating means for generating combination feedback information used for controlling a reproduction operation of the contents and the metadata based on the combination data and, as necessary, external input information; and feedback controlling means for controlling the reproduction operation of the contents by said content reproducing means based on the generated combination feedback information.

3. The content combination reproducer according to claim 2, wherein said content reproducing means, said combination interface information generating means, and said feedback controlling means are integrated into a content reproducer, said combination operation controlling means and said combination feedback information generating means are integrated into a combination processor, and said content reproducer and said combination processor are connected via a network.

4. The content combination reproducer according to claim 1, wherein said combination data storing means has means for storing at least one of advertisement contents, content related service information, content related information contents, content related quiz information, and content related game information as the combination data or for storing obtaining information for obtaining said at least one; and wherein said combination operation controlling means has means for controlling an execution of the combination operation related to said at least one according to said at least one stored in said combination data storing means or according to said at least one obtained based on the obtaining information stored in said combination data storing means and for requesting a provider of said at least one to pay a charge for the combination operation or a part of the charge thereof based on said at least one and the combination operation or an operation result thereof.

5. The content combination reproducer according to claim 1, wherein said combination data storing means is connected to said combination operation controlling means via a network, and wherein said combination operation controlling means has means for accessing said combination data storing means via said network to obtain the combination data stored in said combination data storing means.

6. The content combination reproducer according to claim 1, wherein said content reproducing means has means for obtaining the contents and the metadata attached to the contents via a network.

7. A content combination reproducer capable of providing content related information and services as a combination operation while reproducing contents and, metadata, wherein the metadata includes at least one of the following six pieces of 5W1H information: when, where, who, what, how, and what to do, and wherein the metadata is associated with an object included in one frame of the contents, said content combination reproducer comprising:

combination data storing means for storing therein combination data that corresponds to combination interface information, which includes content reproduction times, data on the one frame of the contents, and metadata associated with the object included in the one frame of the contents, and wherein the combination interface information defines information necessary for executing a combination operation on the contents, and the combination interface information is generated when the contents and the metadata are reproduced, and wherein the combination data defines an operation related to the contents; and combination operation controlling means for obtaining the combination data stored in said combination data storing means to control an execution of the combination operation on the contents after a defining of the combination data based on the combination interface information and by using external input information entered from an external unit as necessary.

8. A content combination reproduction method capable of providing content related information and services as a combination operation while reproducing contents and metadata, wherein the metadata includes at least one of the following six pieces of 5W1H information: when, where, who, what, how, and what to do, and wherein the metadata is associated with an object included in one frame of the contents, said content combination reproduction method comprising the steps of:
- a first step performed by the first system for obtaining the contents and the metadata attached to the contents to reproduce the contents and the metadata;
- a second step performed by the first system for generating combination interface information that includes content reproduction times, data on the one frame of the contents, and metadata associated with the object included in the one frame of the contents, and wherein the combination interface information defines information necessary for executing the combination operation on the contents when the contents and the metadata are obtained;
- a third step performed by the first system for creating combination data, which corresponds to the combination interface information, and wherein the combination data defines an operation related to the contents, in advance and for storing the combination data in combination data storing means; and
- a fourth step performed by the first system or a second system for obtaining the combination data stored in said combination data storing means to control an execution of the combination operation on the contents after a defining of the combination data based on the combination interface information and by using external input information entered from an external unit as necessary.

9. The content combination reproduction method according to claim 8, further comprising the steps of:
- a fifth step performed by the first system or the second system for generating combination feedback information used for controlling a reproduction operation of the contents and the metadata based on the combination data and, as necessary, external input information; and
- a sixth step performed by the first system for controlling the reproduction operation of the contents by said first step based on the generated combination feedback information.

10. The content combination reproduction method according to claim 8, wherein said third step comprises a seventh step for storing at least one of advertisement contents, content related service information, content related information contents, content related quiz information, and content related game information as the combination data or for storing obtaining information for obtaining said at least one in said combination data storing means and
- wherein said fourth step comprises an eighth step for controlling an execution of the combination operation related to said at least one according to said at least one stored in said combination data storing means or according to said at least one obtained based on the obtaining information stored in said combination data storing means and for requesting a provider of said at least one to pay a charge for the combination operation or a part of the charge thereof based on said at least one and the combination operation or an operation result thereof.

11. A content combination reproduction method capable of providing content related information and services as a combination operation while reproducing contents and metadata, wherein the metadata includes at least one of the following six pieces of 5W1H information: when, where, who, what, how, and what to do, and wherein the metadata is associated with an object included in one frame of the contents, said content combination reproduction method comprising the steps of:
- a first step performed by the first system for creating combination data that corresponds to combination interface information, which includes content reproduction times, data on the one frame of the contents, and metadata associated with the object included in the one frame of the contents, and wherein the combination interface information defines information necessary for executing a combination operation on the contents, and the combination interface information is generated when the contents and the metadata are reproduced, and wherein the combination data defines an operation related to the contents and for storing the created combination data in combination date storing means; and
- a second step performed by the first system or a second system for obtaining the combination data stored in said combination data storing means to control an execution of the combination operation on the contents after a defining of the combination data based on the combination interface information and by using external input information entered from an external unit as necessary.

12. A computer readable recording medium on which is encoded program code for a content combination reproduction method capable of providing content related information and services as a combination operation while reproducing contents and metadata, wherein the metadata includes at least one of the following six pieces of 5W1H information: when, where, who, what, how, and what to do, and wherein the metadata is associated with an object included in one frame of the contents, said program code comprising:
- program code for obtaining the contents and the metadata attached to the contents to reproduce the contents and the metadata;
- program code for generating combination interface information that includes content reproduction times, data on the one frame of the contents, and metadata associated with the object included in the one frame of the contents and wherein the combination interface information defines information necessary for executing the combination operation on the contents when the contents and the metadata are obtained;
- program code for creating combination data, which corresponds to the combination interface information, and wherein the combination data defines an operation related to the contents, in advance and for storing the combination data in combination data storing means; and
- program code for obtaining the combination data stored in said combination data storing means to control an execution of the combination operation on the contents after a defining of the combination data based on the combination interface information and by using external input information entered from an external unit as necessary.

13. A computer readable recording medium on which is encoded program code for a content combination reproduction method capable of providing content related information and services as a combination operation while reproducing contents and metadata, wherein the metadata includes at least one of the following six pieces of 5W1H information: when, where, who, what, how, and what to do, and wherein the metadata is associated with an object included in one frame of the contents, said program code comprising:

program code for creating combination data that corresponds to combination interface information, which includes content reproduction times, data on the one frame of the contents, and metadata associated with the object included in the one frame of the contents, wherein the combination interface information defines information necessary for executing a combination operation on the contents, and the combination interface information is generated when the contents and the metadata are reproduced, and wherein the combination data defines an operation related to the contents and for storing the created combination data in combination data storing means; and program code for obtaining the combination data stored in said combination data storing means to control an execution of the combination operation on the contents after a defining of the combination data based on the combination interface information and by using external input information entered from an external unit as necessary.

* * * * *